United States Patent
Srikanth et al.

(10) Patent No.: US 11,131,398 B2
(45) Date of Patent: Sep. 28, 2021

(54) SMART PINCH VALVE

(71) Applicant: Automatic Switch Company, Florham Park, NJ (US)

(72) Inventors: Rachakonda Naga Srikanth, Edison, NJ (US); Jeffrey Loprete, Boonton Township, NJ (US); Christopher Ganci, Rockaway, NJ (US)

(73) Assignee: AUTOMATIC SWITCH COMPANY, Florham Park, NJ (US)

( * ) Notice: Subject to any disclaimer, the term of this patent is extended or adjusted under 35 U.S.C. 154(b) by 0 days.

(21) Appl. No.: 16/103,621

(22) Filed: Aug. 14, 2018

(65) Prior Publication Data

US 2020/0056707 A1    Feb. 20, 2020

(51) Int. Cl.
| | |
|---|---|
| F16K 7/07 | (2006.01) |
| F16K 37/00 | (2006.01) |
| F16K 31/122 | (2006.01) |
| F16K 7/04 | (2006.01) |
| G05D 7/06 | (2006.01) |

(52) U.S. Cl.
CPC ............ *F16K 7/07* (2013.01); *F16K 31/1221* (2013.01); *F16K 37/005* (2013.01); *F16K 37/0041* (2013.01); *F16K 7/045* (2013.01); F16K 37/00 (2013.01); G05D 7/0635 (2013.01)

(58) Field of Classification Search
CPC ...... F16K 37/0041; F16K 37/005; F16K 7/06; F16K 31/1221; F16K 7/07
USPC ............................................ 137/624.12, 551
See application file for complete search history.

(56) References Cited

U.S. PATENT DOCUMENTS

| | | |
|---|---|---|
| 2,674,435 A | 4/1954 | Angell |
| 3,456,648 A | 7/1969 | Lee |
| 3,653,543 A | 4/1972 | Preikschat |
| 3,826,461 A | 7/1974 | Summerfield et al. |
| 4,259,985 A | 4/1981 | Bergmann |
| 4,524,802 A | 6/1985 | Lawrence et al. |
| 4,533,347 A | 8/1985 | Deckert |
| 4,684,102 A | 8/1987 | Dykstra |

(Continued)

FOREIGN PATENT DOCUMENTS

| | | |
|---|---|---|
| CN | 106895174 A | 6/2017 |
| EP | 2604982 B1 | 12/2011 |

(Continued)

OTHER PUBLICATIONS

Cole-Parmer, Solenoid-Operated Pinch Valves; Coleparmer.com Item #EW=98302-46, accessed: Dec. 2017.

(Continued)

*Primary Examiner* — Umashankar Venkatesan
(74) *Attorney, Agent, or Firm* — Mackey Law Firm PLLC

(57) ABSTRACT

A control module for a pinch valve can include a housing, a controller, a display, one or more indicators and one or more sensors, such as flow sensors, proximity sensors or tube sensors. A control module can support monitoring or operation of one or more pinch valves within a fluid control system. A pinch valve can include one or more control modules and a pinch valve system can include a plurality of pinch valves and a plurality of control modules. A method of controlling a pinch valve can include controlling fluid flow operations based on input from one or more sensors.

21 Claims, 16 Drawing Sheets

(56) References Cited

U.S. PATENT DOCUMENTS

| | | | |
|---|---|---|---|
| 4,821,769 A * | 4/1989 | Mills | F16K 37/0041 137/554 |
| 4,878,646 A | 11/1989 | Edelman et al. | |
| 5,038,820 A * | 8/1991 | Ames | F16K 31/02 137/460 |
| 5,050,062 A * | 9/1991 | Hass | G05D 23/1393 137/624.12 |
| 5,078,361 A | 1/1992 | Nordman | |
| 5,221,268 A | 6/1993 | Barton et al. | |
| 5,273,517 A | 12/1993 | Barone et al. | |
| 5,445,613 A | 8/1995 | Orth | |
| 5,454,406 A * | 10/1995 | Rejret | B67D 1/1213 137/624.12 |
| 6,079,628 A | 6/2000 | Kenny | |
| 6,082,702 A | 7/2000 | Campau | |
| 6,241,485 B1 | 6/2001 | Warwick | |
| 6,348,156 B1 | 2/2002 | Vishnoi et al. | |
| 6,361,016 B1 | 3/2002 | Schulz | |
| 6,382,226 B1 * | 5/2002 | Larson | F16K 37/0091 137/1 |
| 6,682,044 B2 | 1/2004 | Miller | |
| 6,695,278 B2 | 2/2004 | Ellis | |
| 6,712,963 B2 | 3/2004 | Schick | |
| 6,736,163 B1 | 5/2004 | Partanen | |
| 6,755,388 B2 | 6/2004 | Furukawa et al. | |
| D524,911 S | 7/2006 | Thompson et al. | |
| 7,104,275 B2 | 9/2006 | Dille | |
| 7,194,919 B2 | 3/2007 | Shkarlet et al. | |
| D546,920 S | 7/2007 | Fulkerson | |
| D548,818 S | 8/2007 | Feng et al. | |
| 7,255,321 B2 | 8/2007 | Tomioka et al. | |
| D617,421 S | 6/2010 | Fulkerson | |
| 7,845,369 B2 | 12/2010 | Atassi | |
| 7,861,740 B2 | 1/2011 | Phallen et al. | |
| 7,896,310 B2 | 3/2011 | Johansson et al. | |
| 7,922,700 B2 | 4/2011 | Evans et al. | |
| 8,419,676 B2 | 4/2013 | Evans et al. | |
| 8,622,365 B2 | 1/2014 | Fukano et al. | |
| D726,873 S | 4/2015 | Fulkerson et al. | |
| D726,875 S | 4/2015 | Wong et al. | |
| D726,874 S | 7/2015 | Wong et al. | |
| D734,432 S | 7/2015 | Sato et al. | |
| D735,834 S | 8/2015 | Wong et al. | |
| 9,103,451 B2 | 8/2015 | Kitano et al. | |
| 9,127,781 B2 | 9/2015 | Opfer et al. | |
| 9,180,676 B2 | 11/2015 | Dyer et al. | |
| D744,615 S | 12/2015 | Fulkerson et al. | |
| 9,387,504 B2 | 7/2016 | Paetow et al. | |
| D766,402 S | 9/2016 | Mangold | |
| D768,823 S | 10/2016 | Harck et al. | |
| D770,018 S | 10/2016 | Musolf et al. | |
| D780,296 S | 2/2017 | Fletcher et al. | |
| D785,756 S | 5/2017 | Ueno et al. | |
| 9,676,244 B2 | 6/2017 | Giovanardi et al. | |
| D800,871 S | 10/2017 | Arai | |
| D801,481 S | 10/2017 | Ueno et al. | |
| 9,803,754 B2 | 10/2017 | Thompson | |
| D802,095 S | 11/2017 | Fletcher et al. | |
| 9,934,969 B2 | 4/2018 | Tsai et al. | |
| 2002/0139419 A1 | 10/2002 | Flinchbaugh | |
| 2003/0107013 A1 | 6/2003 | Pappo et al. | |
| 2007/0125429 A1 | 6/2007 | Kandl | |
| 2007/0179423 A1 * | 8/2007 | Felt | A61M 1/0209 604/6.01 |
| 2010/0229975 A1 * | 9/2010 | Sweeney | G05B 9/03 137/556 |
| 2012/0018654 A1 | 1/2012 | Wennberg et al. | |
| 2012/0273048 A1 * | 11/2012 | Weatherbee | A61M 39/28 137/1 |
| 2014/0216557 A1 | 8/2014 | Klewinghau | |
| 2014/0238512 A1 * | 8/2014 | Bowers | F16K 37/0083 137/554 |
| 2015/0006091 A1 * | 1/2015 | Schoonover | G01M 3/007 702/39 |
| 2015/0323486 A1 | 11/2015 | Schick et al. | |
| 2016/0161004 A1 * | 6/2016 | Thompson | F16K 31/0655 251/8 |
| 2016/0223087 A1 | 8/2016 | Gillespie, III et al. | |
| 2016/0291603 A1 | 10/2016 | Chin et al. | |
| 2016/0339229 A1 | 11/2016 | Hung et al. | |
| 2017/0138505 A1 * | 5/2017 | Murata | H01F 7/064 |
| 2020/0041035 A1 * | 2/2020 | Huang | F16K 7/07 |

FOREIGN PATENT DOCUMENTS

| | | |
|---|---|---|
| EP | 2517753 A1 | 10/2012 |
| GB | 873413 A | 7/1961 |
| JP | 201698005 A | 5/2016 |
| WO | 9533151 A1 | 12/1995 |
| WO | 2008086849 A1 | 7/2008 |
| WO | 2016090281 A1 | 6/2016 |
| WO | 2017005929 A2 | 2/2017 |
| WO | 2017025715 A1 | 2/2017 |
| WO | 2018156570 A1 | 8/2018 |

OTHER PUBLICATIONS

Oriwen, Oriwen.com, 12VDC NC Pinch Valve 05TProduct No. BNC12005, Shanghai Oriwen Co., Ltd., accessed: Dec. 2017.

Anderson-Bolds, Valcor Engineering Corporation, anderson-bolds.com, accessed: Dec. 2017.

Schramme, .magnetbau-schramme.de, Schlauchklemmventile / pinch valve; GL5032F42, Apr. 2017.

Beion Corporation USA, Product: Pinch Valve; beion.com, accessed: Dec. 2017.

Extended European Search Report dated Jan. 14, 2020 for European Patent Application 19191651.9.

EPO Application No. 19191651.9 Examination Report dated Feb. 9, 2021.

* cited by examiner

SMART PINCH VALVE

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The present disclosure relates generally to valves and more specifically relates to pinch valves and control systems for pinch valves.

Description of the Related Art

Flow control systems are common in process and manufacturing systems, such as in sterile, aseptic, physiological and food applications, among others, including applications in hazardous or harsh environments. It can be important to accurately control various parameters in such systems, including flow rates and other fluidically controlled components. Accordingly, fluid control systems and valves that provide rapid and accurate control of fluids are called for in numerous industries. Further, some industries and applications call for fluid control systems and valves that incorporate features relating to safety, system monitoring and protection against failures. In addition, in the current state of technology, there is often a demand for fluid control components, including valves, that fit into relatively small spaces versus their larger predecessors without comprising performance or functionality.

A pinch valve is a type of control valve that typically utilizes a pinching action to compress a flexible tube and thereby obstruct fluid flow through the tube. Many pinch valves have default positions, such as normally open or normally closed, to which the valve defaults until actuated. Some pinch valves can be controlled by pneumatic means using compressed air to actuate the pinching mechanism for controlling fluid flow within a tube disposed in an opening in the valve. In the event of a loss of power or air pressure, a pinch valve may have a default or failure mode, such as fully open or fully closed. In some cases, compressible tubing used with pinch valves can become dislodged from the opening in the valve or worn or damaged such as due to repeated pinching over time. Further, if a pinch valve fails during system operations, it may become stuck in an undesirable position which can cause problems in the overall operation of the system or a component thereof.

Accordingly, there is a need in the art for improved pinch valves for minimizing wear on the tubing, as well as the space required for the valve and related components. Additionally, there is a need in the art for improved pinch valve control systems for cooperating with other fluid system components and providing advantageous control and fail-safe features. The disclosures and teachings herein are directed to systems and methods for improved pinch valve structures and control systems.

BRIEF SUMMARY OF THE INVENTION

A control module for a pinch valve can include a controller housing, one or more controllers coupled to the controller housing, one or more displays coupled to the controller housing, one or more indicators coupled to the controller housing, and one or more sensors coupled to the controller, such as flow sensors, proximity sensors and/or tube sensors. A control module or controller housing can be adapted to couple to a pinch valve or one or more portions thereof. One or more flow sensors can include first and second flow sensors coupled to a housing and a controller housing can be adapted to dispose the first and second flow sensors on opposite sides of a tube slot, such as when the controller housing is coupled to a pinch valve. One or more flow sensors can be coupled to supports, such as extensions or arms, which can be disposed on a side of a controller housing, such as opposite or otherwise relative to a display or other module component.

A control module can include first and second proximity sensors configured to sense one or more targets or other components for determining whether a pinch valve is in one or more positions, such as one or more open or closed positions, fully, partially or otherwise. A controller housing can be configured to couple to at least one of a pinch valve housing, a pinch valve headpiece and a combination thereof. A controller housing can be configured to couple to a pinch valve on a side opposite a tube slot opening, on a side including a tube slot, or on another portion of a valve or valve component.

A controller housing can include a guard configured to cover at least a portion of a tube slot when the controller housing is coupled to a pinch valve. A controller housing can be configured to couple to a pinch valve by at least one of mechanical fasteners, adhesive, snap-fit and a combination thereof, and can include one or more components for communicating in a wired or wireless configuration, such as transmitters or receivers. A control module can include one or more data ports, such as a data port coupled to the controller housing, which can be configured for electronic communication between one or more controllers disposed within the module and one or more second controllers disposed elsewhere, such as distally from the module or outside of the controller housing.

A control module can be configured to communicate with a process controller. One or more controllers can be configured to output at least one of a valve operation cycle count, an alarm signal, a dosing signal, a metering signal, a batch control signal, and a combination thereof. An indicator can include one or more indicator lights and can configured to display one or more of a plurality of indications, such as based on one or more signals from one or more sensors, such as at least one of one or more flow sensors, one or more proximity sensors, one or more tube sensors and a combination thereof. Operation of one or more sensors can be dependent upon one or more signals from one or more other sensors. Operation of the one or more flow sensors can be dependent upon one or more signals from at least one of one or more proximity sensors, one or more tube sensors and a combination thereof.

A pinch valve can include a valve housing, a headpiece coupled to the valve housing, wherein the headpiece can include a tube slot adapted to receive a portion of tubing through a tube slot opening, and a control module. The control module can include a controller housing coupled to at least one of the valve housing, the headpiece and a combination thereof, a controller disposed at least partially within the controller housing, a display coupled to the controller housing, one or more indicator lights coupled to the controller housing, one or more flow sensors electronically coupled to the controller, one or more proximity sensors electronically coupled to the controller, and one or more tube sensors electronically coupled to the circuit board.

A pinch valve can include one or more flow sensors, such as first and second flow sensors, coupled to the controller housing and disposed on opposite sides of the tube slot. One or more flow sensors can be disposed upstream and/or downstream from a tube slot. One or more flow sensors can be coupled to a controller housing or a portion thereof and can be disposed in one or more locations relative to other valve or module components. A pinch valve can include one or more proximity sensors, such as first and second proximity sensors, which can be coupled to the valve housing and configured to sense at least one target for determining whether the pinch valve is in one or more positions. A controller housing can be disposed for blocking a tube slot opening or avoiding interference with a tube slot opening. A control module can be configured to send a signal to a pump controller based on a signal from at least one of one or more sensors.

DETAILED DESCRIPTION

Figure 1:
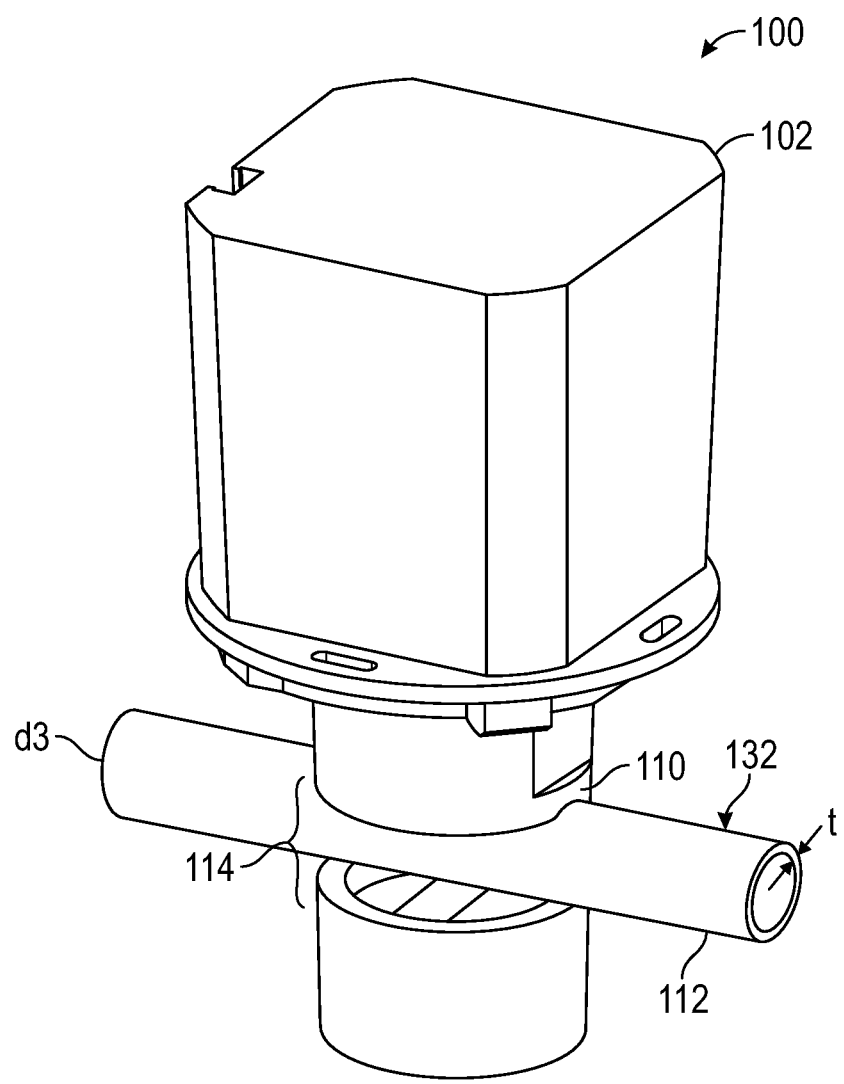
FIG. 1 is a perspective view of one of many embodiments of a pinch valve according to the disclosure.

The Figures described above and the written description of specific structures and functions below are not presented to limit the scope of what Applicants have invented or the scope of the appended claims. Rather, the Figures and written description are provided to teach any person skilled in the art to make and use the invention(s) for which patent protection is sought. Those skilled in the art will appreciate that not all features of a commercial embodiment of the disclosure are described or shown for the sake of clarity and understanding. Persons of skill in this art will also appreciate that the development of an actual commercial embodiment incorporating aspects of the present disclosure can require numerous implementation-specific decisions to achieve the developer's ultimate goal for the commercial embodiment (s). Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in the art having the benefits of this disclosure. It must be understood that the embodiment(s) disclosed and taught herein are susceptible to numerous and various modifications and alternative forms. The use of a singular term, such as, but not limited to, "a," is not intended as limiting of the number of items. The use of relational terms, such as, but not limited to, "top," "bottom," "left," "right," "upper," "lower," "down," "up," "side," "first," "second," ("third" et seq.), "inlet," "outlet" and the like are used in the written description for clarity in specific reference to the Figures and are not intended to limit the scope of the disclosure or the appended claims unless otherwise indicated. The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one member with another in a unity fashion. The coupling can occur in any direction, including rotationally. The terms "include" and "such as" are illustrative and not limitative, and the word "can" means "can, but need not" unless otherwise indicated. Notwithstanding any other language in the present disclosure, the embodiment(s) shown in the drawings are examples presented for purposes of illustration and explanation and are not the only embodiments of the subject(s) hereof.

Applicants have created systems and methods for improved pinch valves and improved control of pinch valves. A control module for a pinch valve can include a housing, a controller, a display, an indicator and one or more sensors for coupling with a pinch valve and supporting operation of the pinch valve, whether separately or in combination with one or more other pinch valves or other pinch valve system components. A pinch valve can include one or more control modules coupled therewith, separately or in combination. A pinch valve system can include one or more pinch valves and one or more control modules coupled therewith, separately or in combination with one another or other system components. Systems and methods of the present disclosure are described in further detail below with reference to the Figures.

Figure 2:
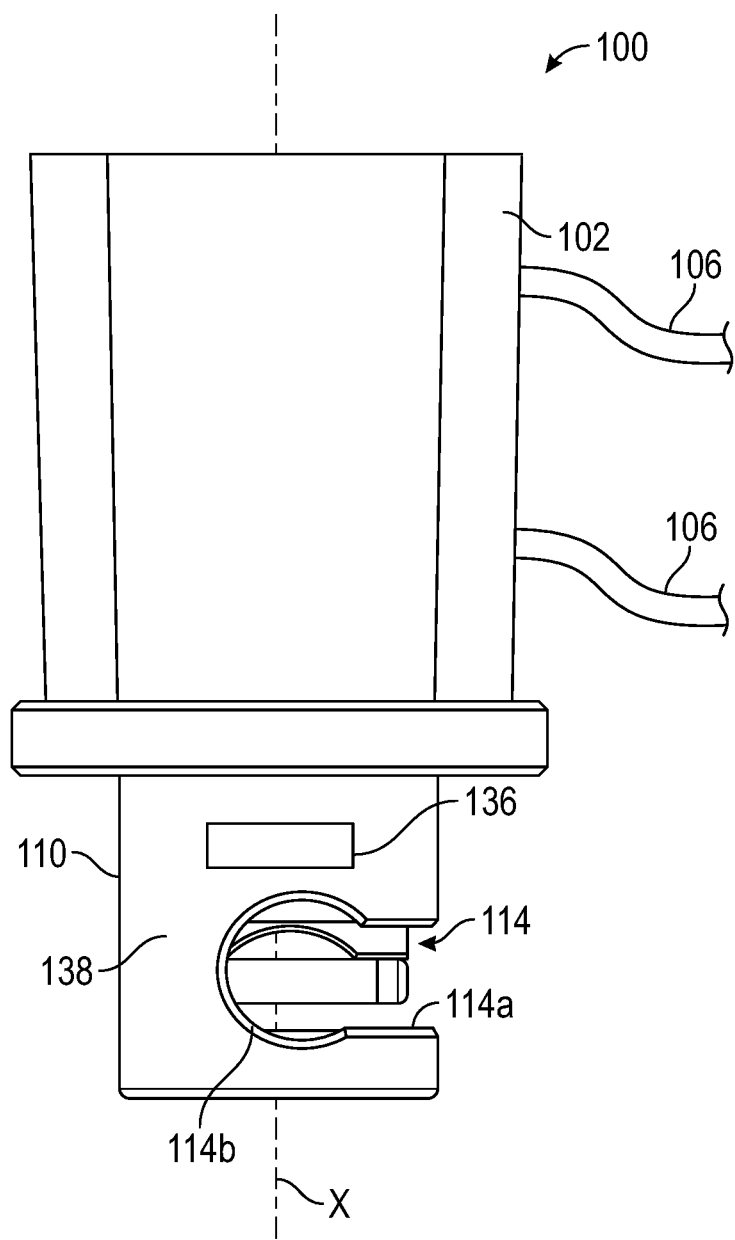
FIG. 2 is a side view of the valve of FIG. 1.
Figure 3:
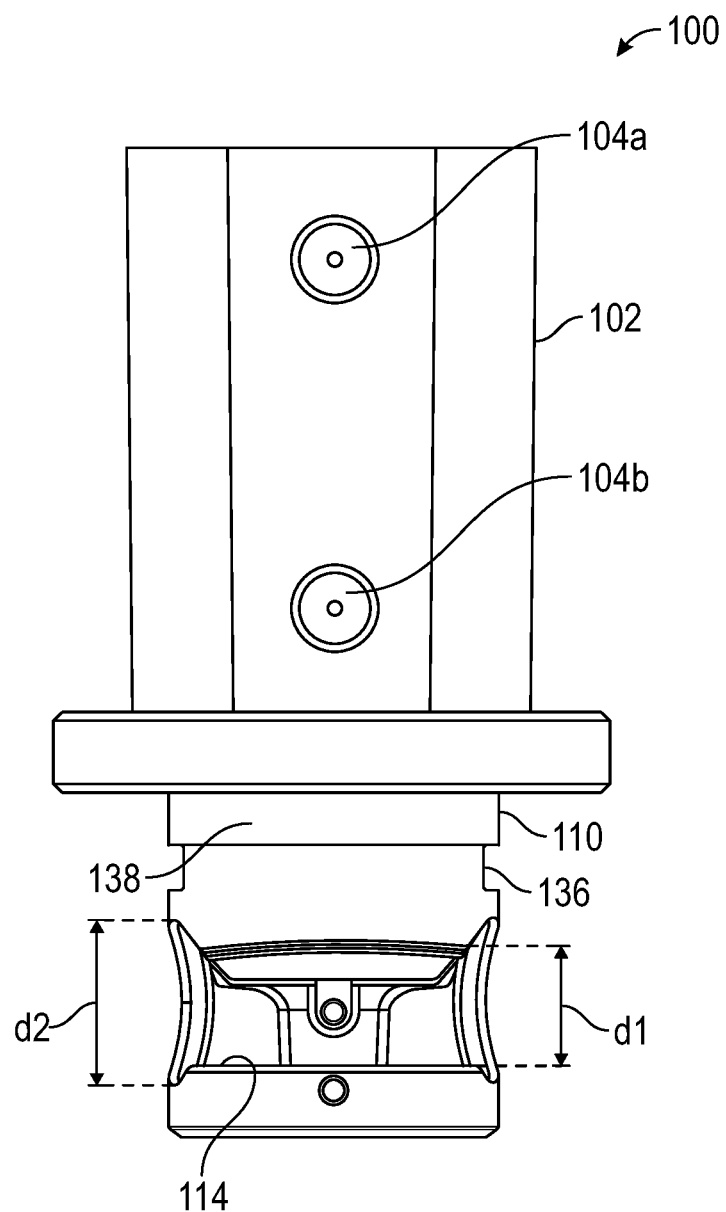
FIG. 3 is a front view of the valve of FIG. 1.
Figure 4:
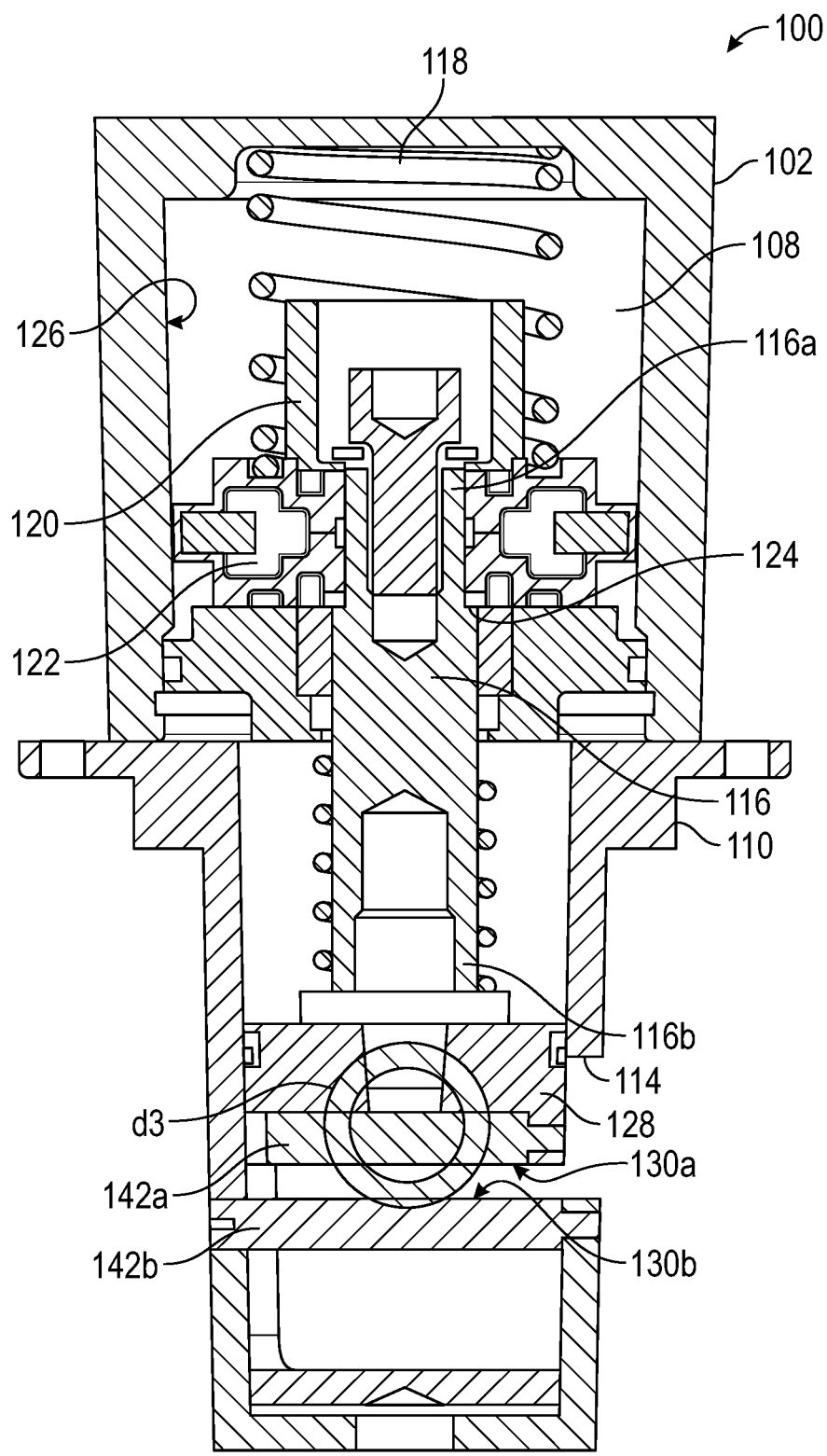
FIG. 4 is a cross-sectional view of the valve of FIG. 1.
Figure 5:
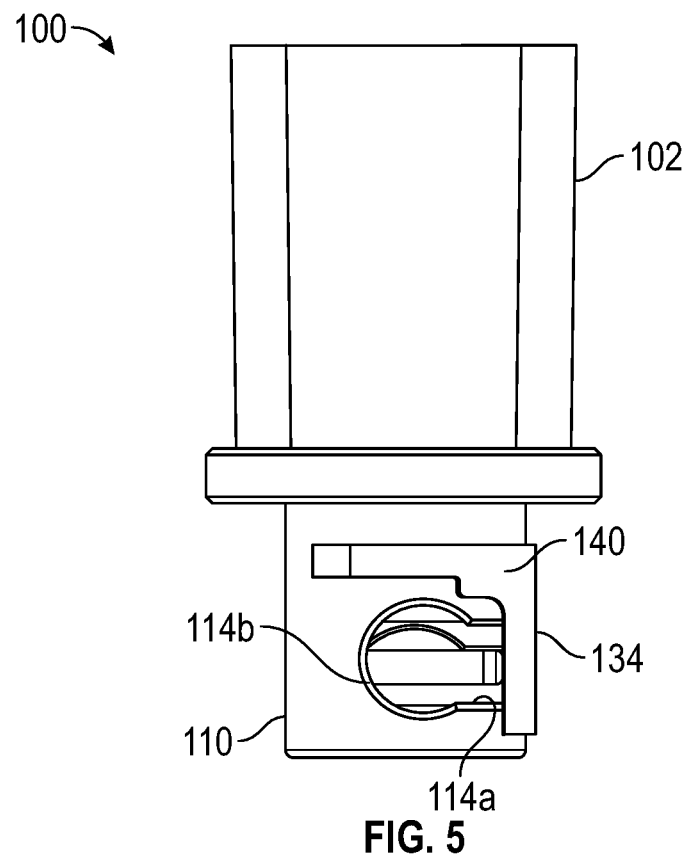
FIG. 5 is a side view of the valve of FIG. 1 including one of many embodiments of a retainer according to the disclosure.
Figure 6:
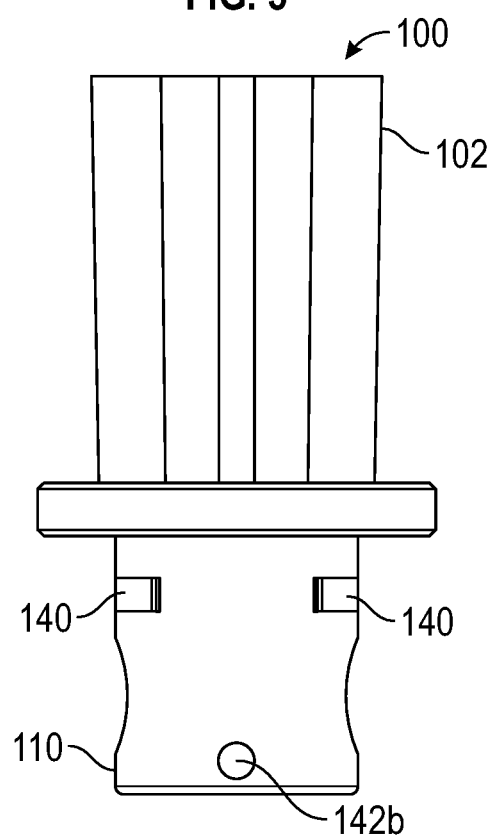
FIG. 6 is a rear view of the valve of FIG. 5.
Figure 7:
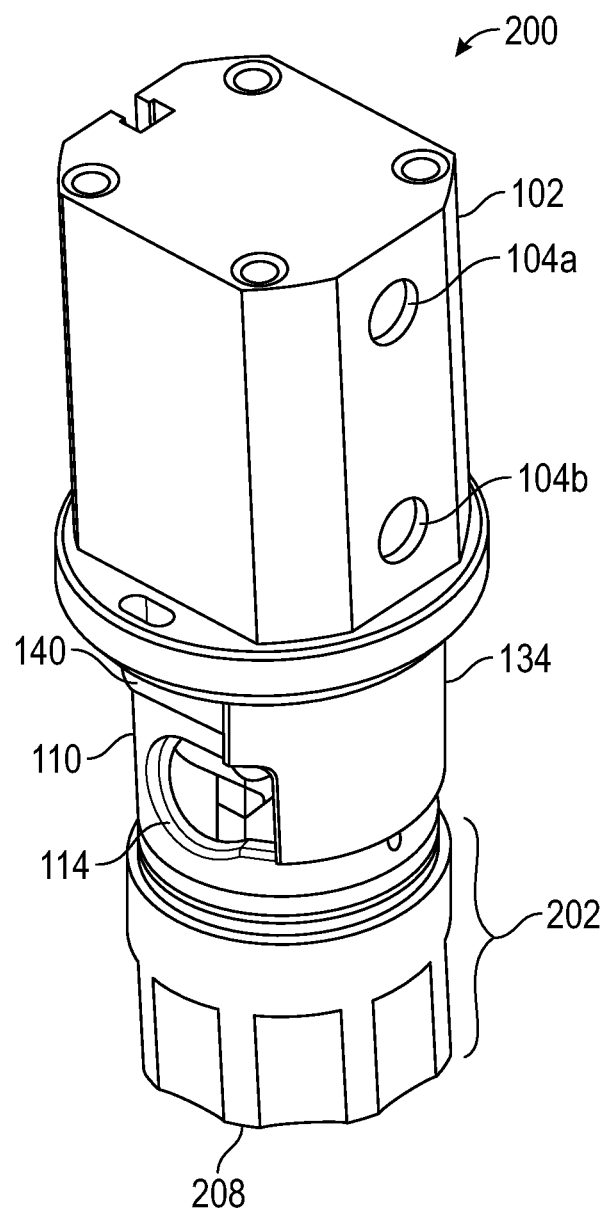
FIG. 7 is a perspective view of another of many embodiments of a pinch valve according to the disclosure.
Figure 8:
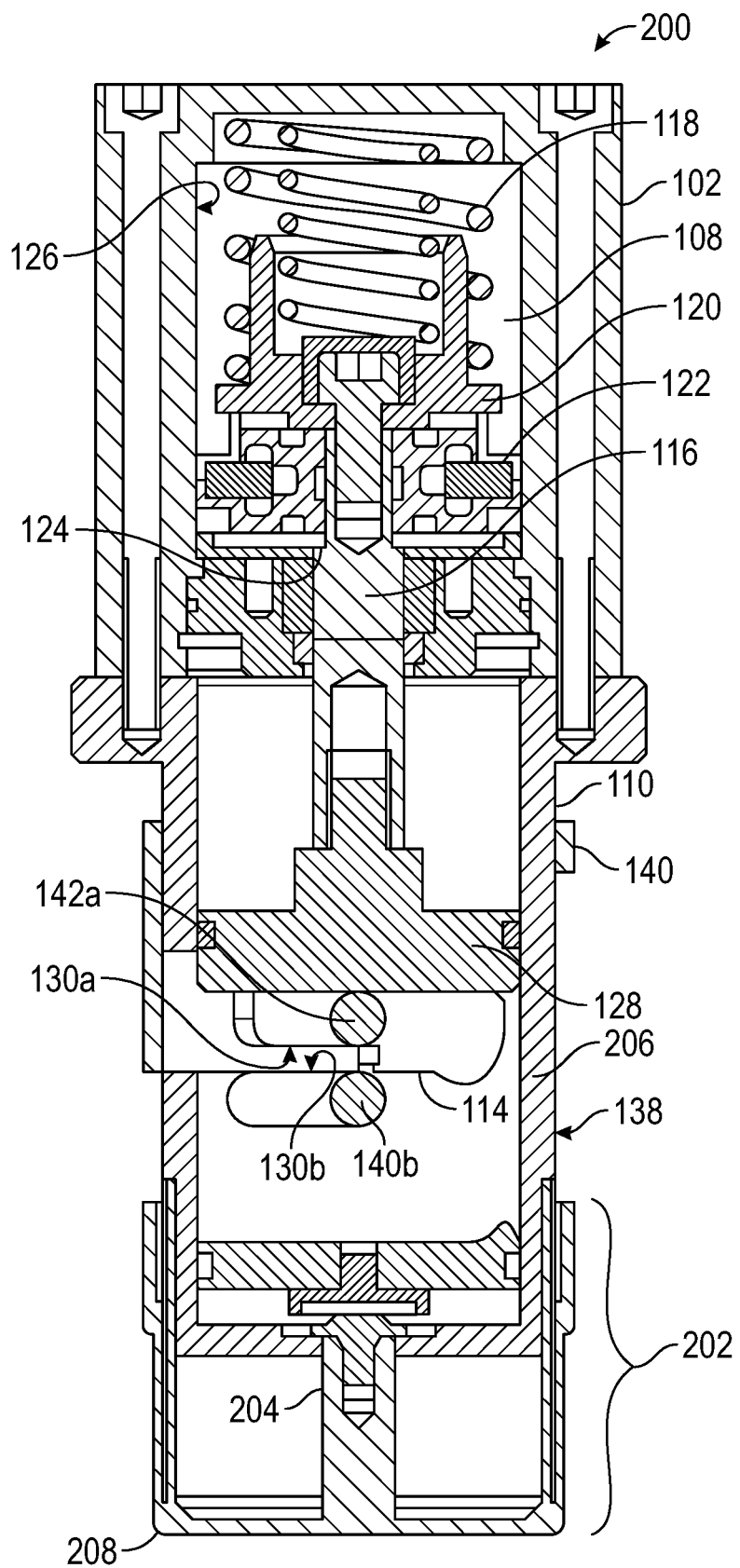
FIG. 8 is a cross-sectional perspective view of the valve of FIG. 7.
Figure 9:
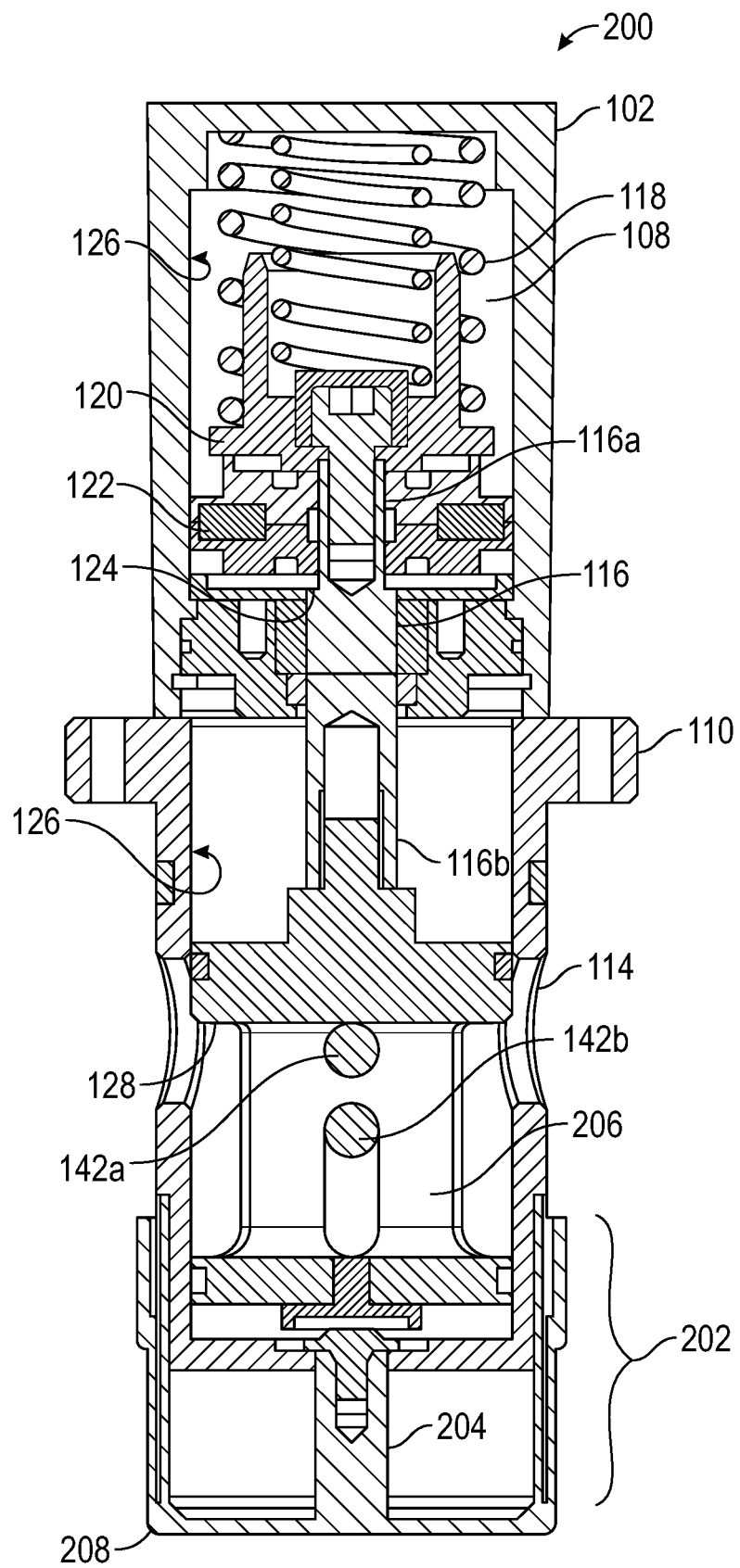
FIG. 9 is a cross-sectional front view of the valve of FIG. 7.
Figure 10:
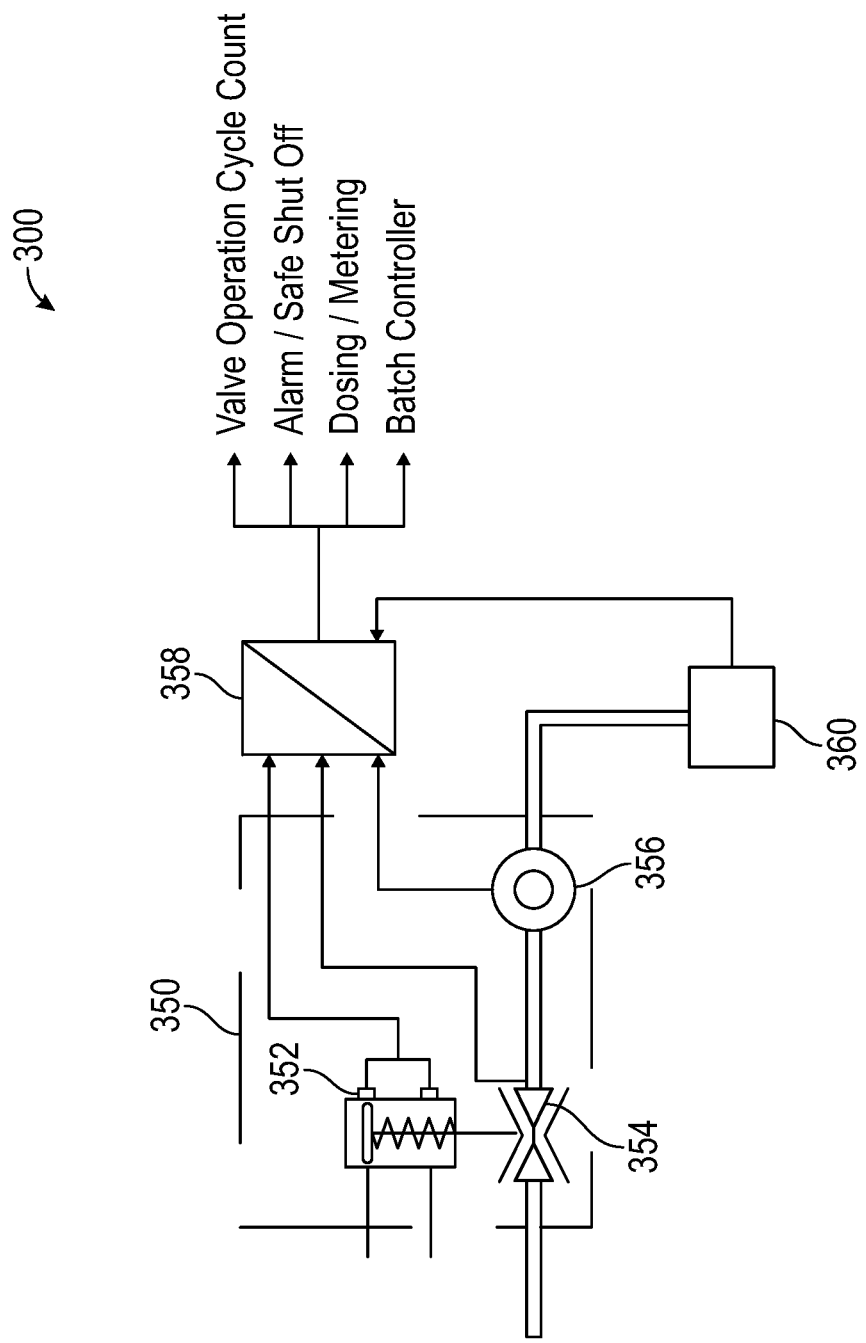
FIG. 10 is a schematic view of one of many embodiments of a valve control system according to the disclosure.
Figure 11:
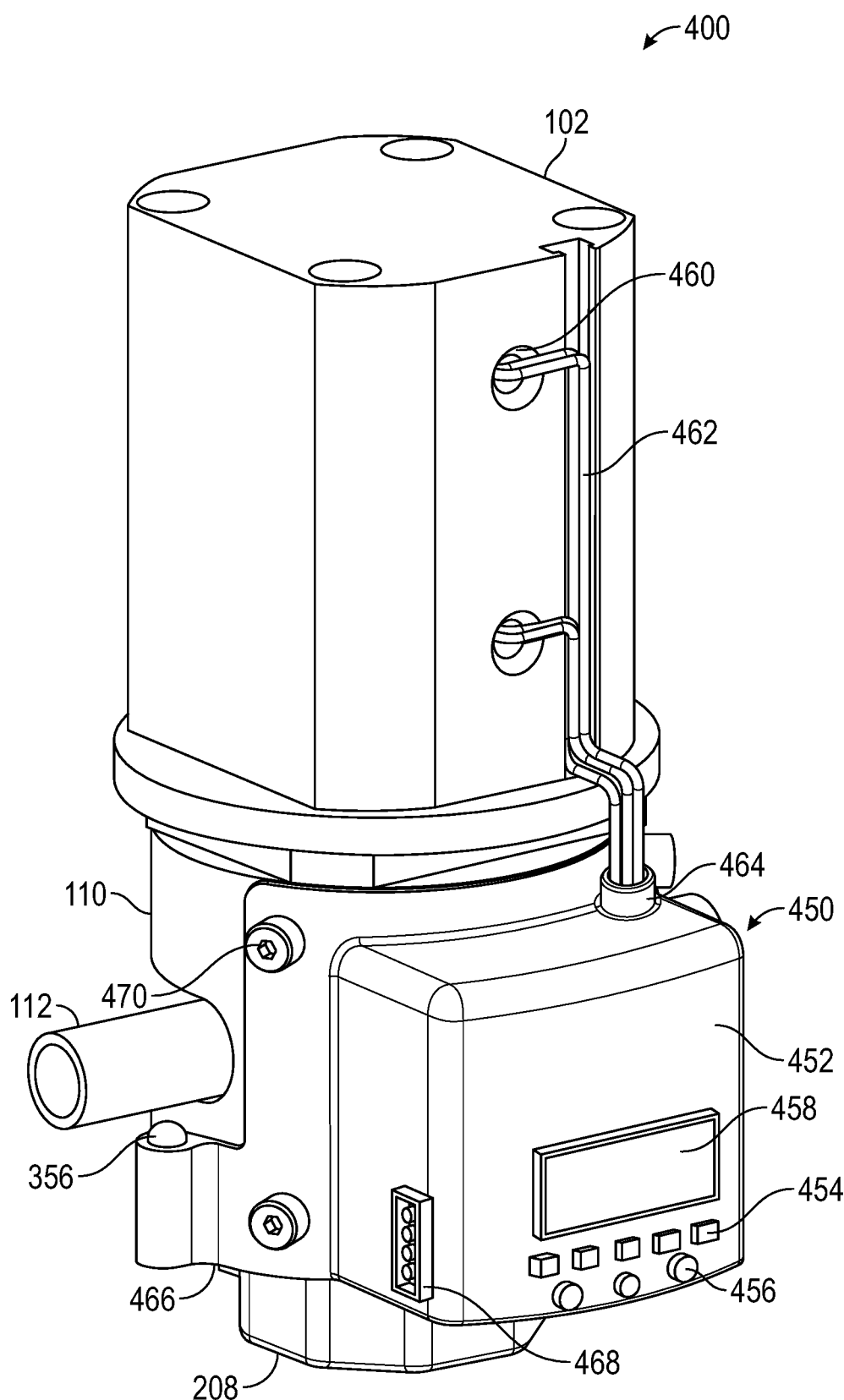
FIG. 11 is a rear perspective view of one of many embodiments of a pinch valve having a control module according to the disclosure.
Figure 12:
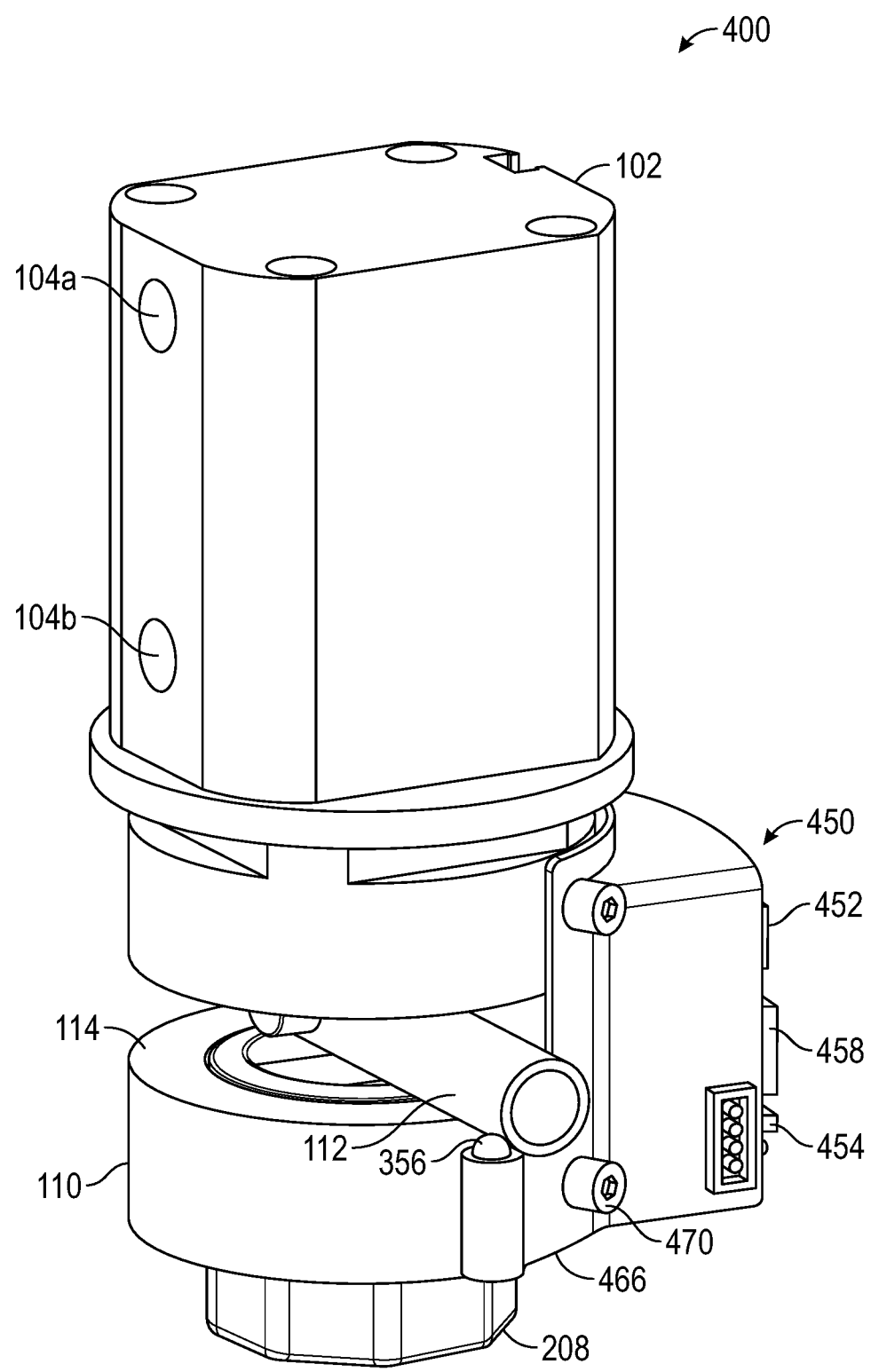
FIG. 12 is a front perspective view of the valve of FIG. 11.
Figure 13:
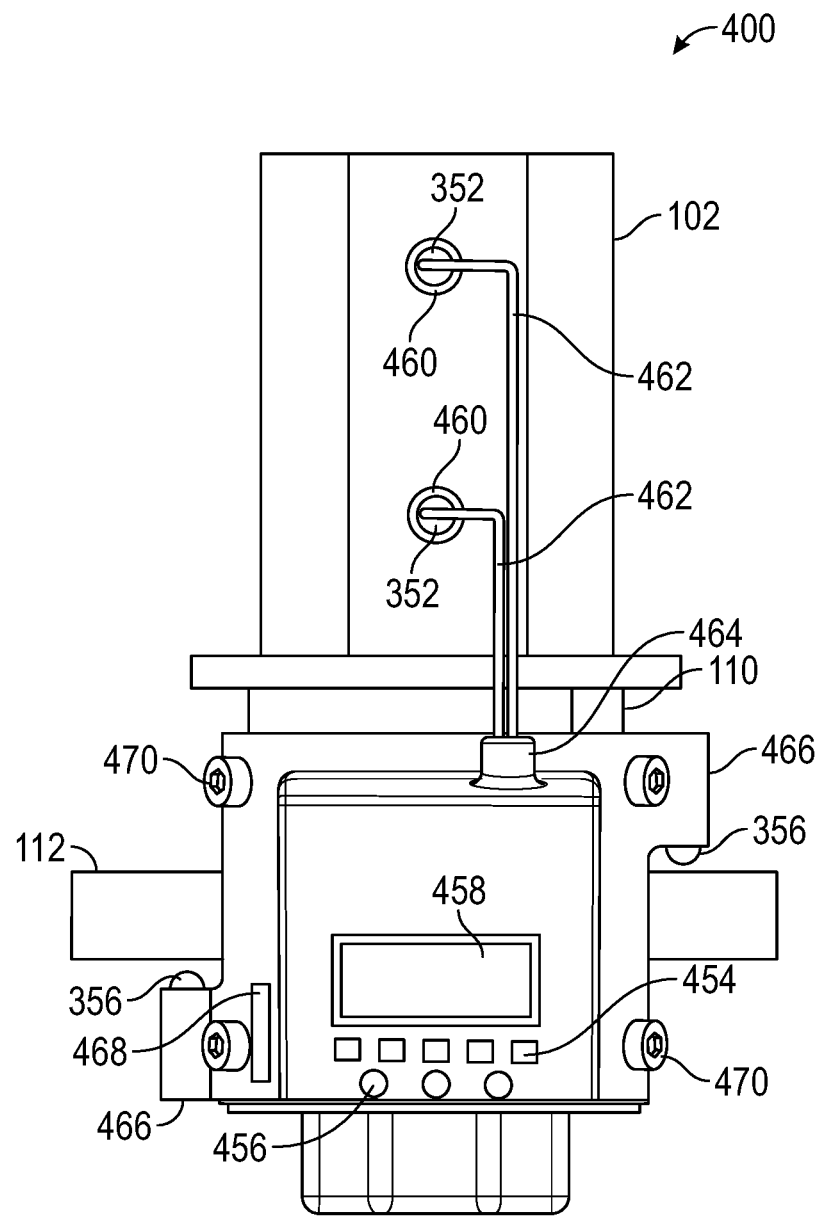
FIG. 13 is a rear view of the valve of FIG. 11.
Figure 14:
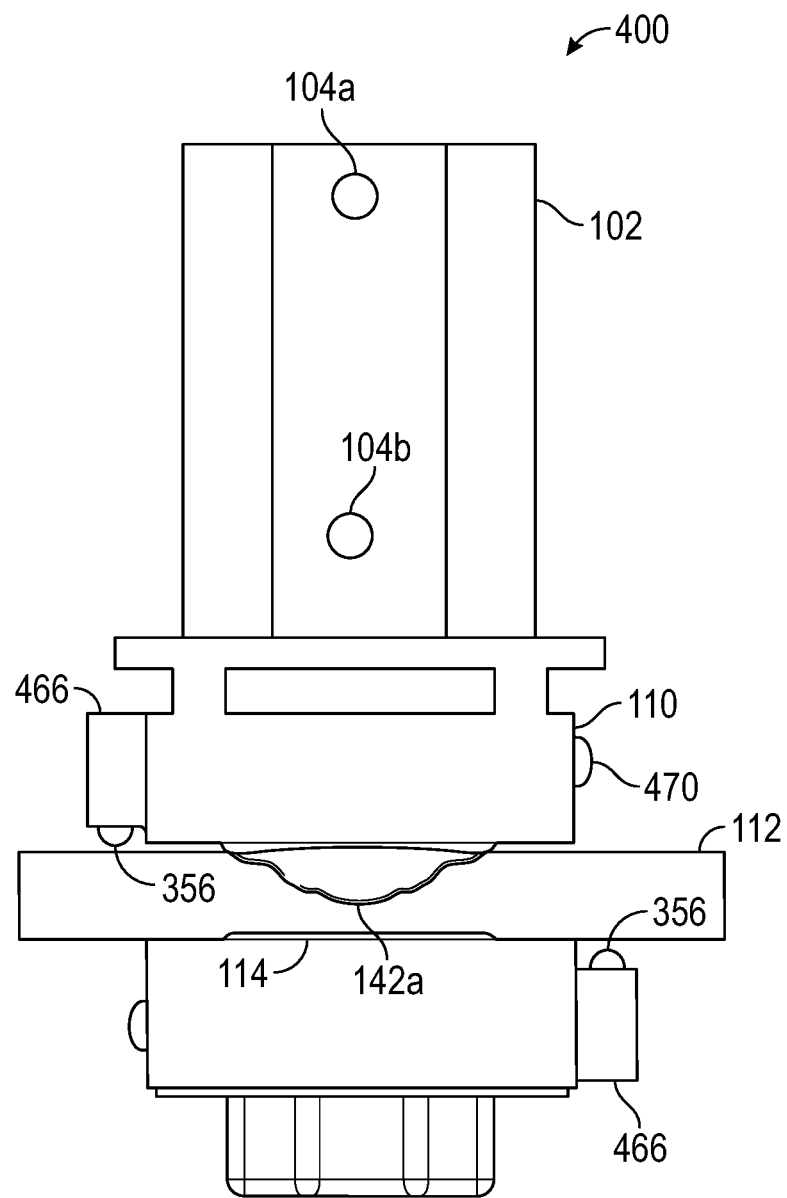
FIG. 14 is a front view of the valve of FIG. 11.
Figure 15:
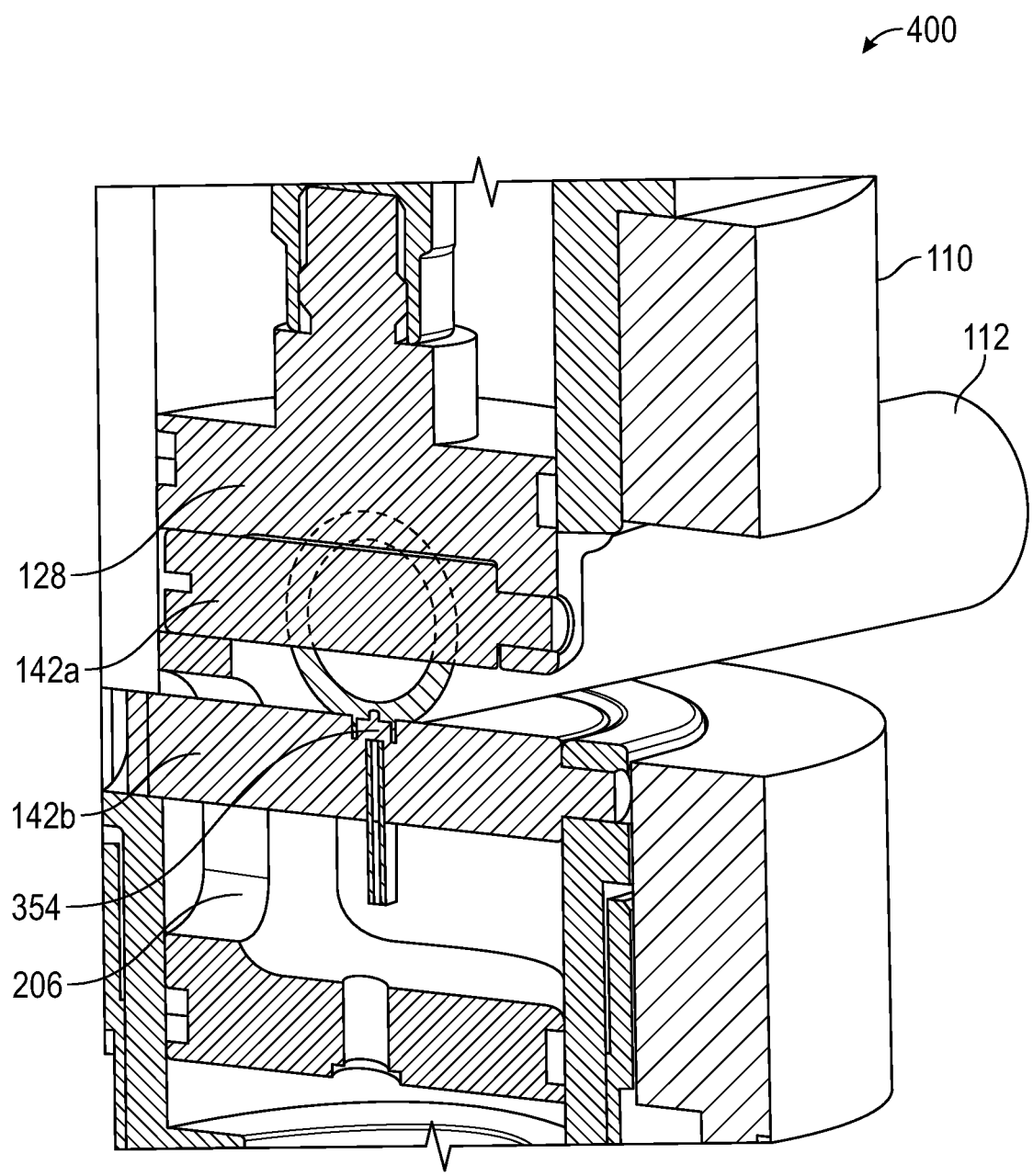
FIG. 15 is a partial cross-sectional perspective view of the valve of FIG. 11.
Figure 16:
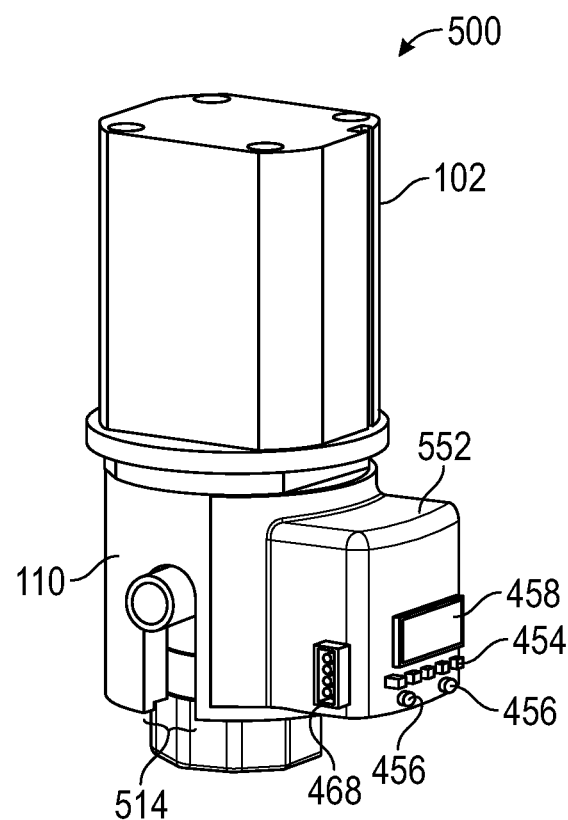
FIG. 16 is a perspective view of another of many embodiments of a pinch valve having a control module according to the disclosure.
Figure 17:
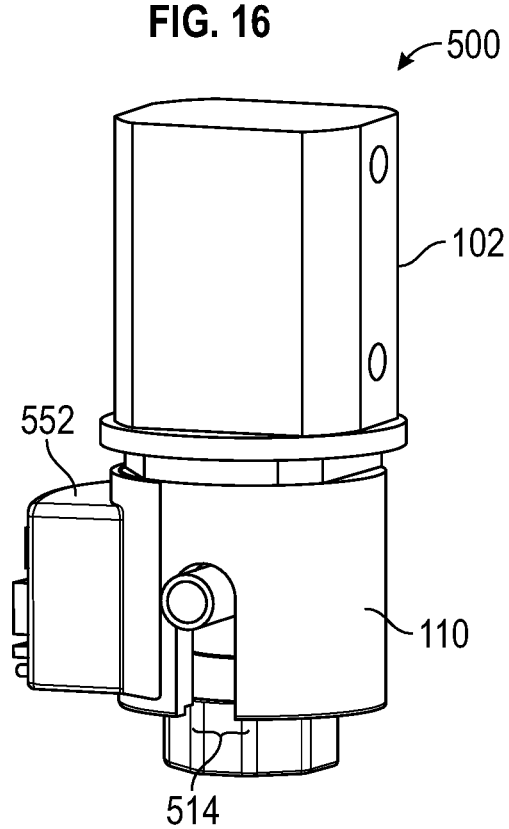
FIG. 17 is another perspective view of the valve of FIG. 16.
Figure 18:
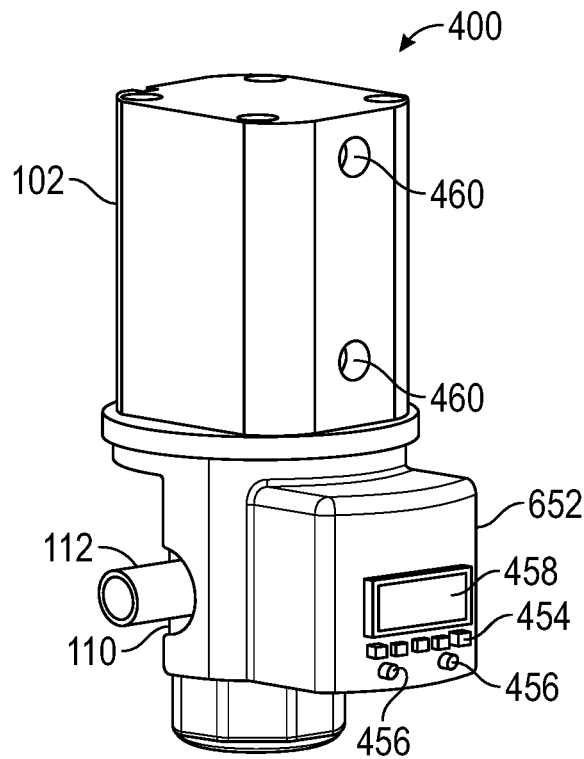
FIG. 18 is a perspective view of yet another of many embodiments of a pinch valve having a control module according to the disclosure.
Figure 19:
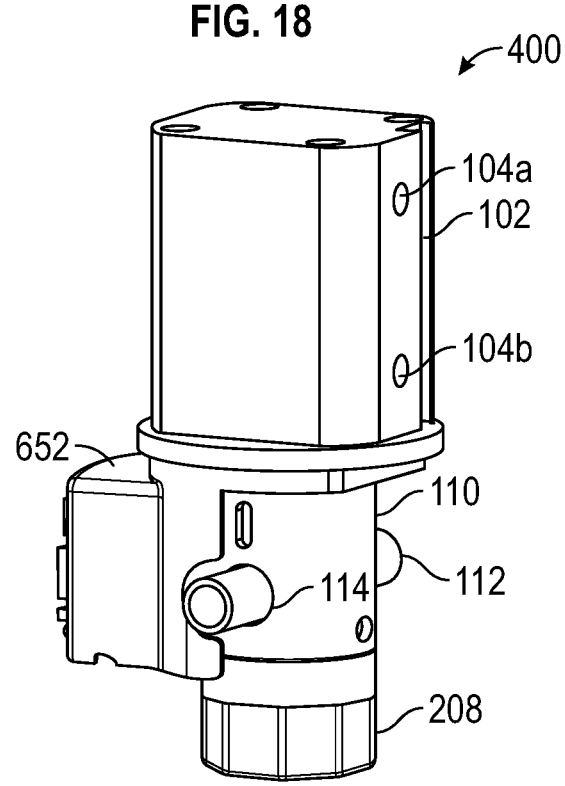
FIG. 19 is another perspective view of the valve of FIG. 18.

FIG. 1 is a perspective view of one of many embodiments of a pinch valve according to the disclosure. FIG. 2 is a side view of the valve of FIG. 1. FIG. 3 is a front view of the valve of FIG. 1. FIG. 4 is a cross-sectional view of the valve of FIG. 1. FIG. 5 is a side view of the valve of FIG. 1 including one of many embodiments of a retainer according to the disclosure. FIG. 6 is a rear view of the valve of FIG. 5. FIG. 7 is a perspective view of another of many embodiments of a pinch valve according to the disclosure. FIG. 8 is a cross-sectional perspective view of the valve of FIG. 7. FIG. 9 is a cross-sectional front view of the valve of FIG. 7. FIG. 10 is a schematic view of one of many embodiments of a valve control system according to the disclosure. FIG. 11 is a rear perspective view of one of many embodiments of a pinch valve having a control module according to the disclosure. FIG. 12 is a front perspective view of the valve of FIG. 11. FIG. 13 is a rear view of the valve of FIG. 11. FIG. 14 is a front view of the valve of FIG. 11. FIG. 15 is a partial cross-sectional perspective view of the valve of FIG. 11. FIG. 16 is a perspective view of another of many embodiments of a pinch valve having a control module according to the disclosure. FIG. 17 is another perspective view of the valve of FIG. 16. FIG. 18 is a perspective view of yet another of many embodiments of a pinch valve having a control module according to the disclosure. FIG. 19 is another perspective view of the valve of FIG. 18. FIGS. 1-18 are described in conjunction with one another.

In at least one embodiment, a pinch valve 100 can include a housing 102 for holding or enclosing one or more other components of the valve, separately or in combination, in whole or in part. Housing 102 can include one or more ports 104, such as first port 104a and second port 104b, for communicating with one or more conduits 106 for supporting operation of the valve. For example, one or more conduits 106 can support fluid communication with valve 100 during operation or actuation, such as by way of compressed air or another fluid. In at least one embodiment, for instance, first port 104a can be or include an inlet for receiving fluid, such as compressed air, into an interior space 108 from a fluid source coupled to valve 100 via conduit 106 and second port 104b can be or include an outlet for bleeding fluid exiting housing 102. Valve 100 can include a headpiece 110 coupled to housing 102 for supporting one or more valve components and receiving a portion of tubing 112, such as flexible or compressible tubing, for cooperating with the valve during valve operations, such as opening or closing operations. Headpiece 110 can include a tubing slot 114, such as a hole or opening, for receiving at least a portion of tubing 112 coupled with valve 100.

Valve 100 can include a piston rod 116, such as a shaft or other member, for supporting operation of the valve, such as by translating motion or force among two or more components or defining one or more distances between two or more components. Piston rod 116 can have one or more piston rod ends, such as first end 116a and second end 116b, which can, but need not, include longitudinally opposite and/or terminal ends, and can be at least partially disposed within at least a portion of housing 102 and/or headpiece 110. Valve 100 can include one or more springs 118 for biasing one or more other components of valve 100 in one or more directions, such as, for example, in a longitudinal direction along central longitudinal axis X of valve 100. For example, spring 118 can be or include any biasing device in accordance with a physical embodiment according to the disclosure. Valve 100 can include a spring guide 120 coupled to one or more other components of the system, such as to piston rod 116, for supporting operation of the valve, such as by translating one or more spring forces to one or more other components of the system. Valve 100 can include a piston plate 122 coupled to the piston rod, for example to first piston rod end 116a or another portion of piston rod, for cooperating with one or more other components of valve 100 to create or enclose one or more spaces or cavities within the valve, such as within housing 102 or space 108. In at least one embodiment, piston plate 122 can be coupled between spring guide 120 and a shoulder 124 of piston rod 116, such as a shoulder of first piston rod end 116a. Piston plate 122 can sealingly engage one or more surfaces, such as interior surface 126 of housing 102, for sealingly or fluidically separating two or more portions or spaces within valve 100. Piston plate 122 can be slidably coupled with housing 102 and can be adapted to slide along, for example, interior surface 126 of the housing 102 among one or more positions, such as between the one or more fluid ports 104 in the housing. Valve 100 can include one or more plungers 128 for optionally engaging or otherwise coupling with one or more other components of the valve. Plunger 128 can be coupled to piston rod 116, such as, for example, to second piston rod end 116b, and can comprise one or more pinching surfaces, such as first pinching surface 130a, for cooperating with one or more other surfaces or components, such as second pinching surface 130b, for optionally pinching tubing 112 coupled to valve 100, which can, but need not, include contacting one or more other pinching surfaces. At least a portion of second pinching surface 130b can be or include a portion of headpiece 110 or a structure coupled to headpiece 110. Second pinching surface 130b can be disposed at least partially within slot 114, but need not be, and in at least one embodiment, can be outside of (e.g., below) slot 114 while nonetheless positioned for cooperating with tubing 112 during valve operations.

At least one of one or more pinching portions or components, including one or both of pinching surfaces 130a, 130b, can be adapted to move among or between one or more positions, such as, for example, fully opened and fully closed valve positions, which can include an open position for allowing maximum fluid flow through tubing 112 and a closed position for ceasing fluid flow through tubing 112, respectively. As will be understood by one of ordinary skill in the art having the benefits of this disclosure, a valve according to the disclosure can be sized and otherwise configured for cooperating with any size or type of pinch valve tubing according to a physical embodiment or implementation of the disclosure, whether now known or future developed. Further, while fully opened and fully closed positions as that terminology is used herein generally refers to maximum fluid flow and zero fluid flow, respectively, for purposes of convenience and ease of explanation, it should be understood that in at least one embodiment, a fully opened and/or fully closed position can be or include, whether optionally, adjustably, fixedly, or otherwise, positions that allow for less than maximum and more than zero fluid flow, respectively, through an applicable tubing, which can include any fluid flow rate or rates required or desired for a physical embodiment of the disclosure.

Tubing slot 114 can, but need not, have a uniform size and/or shape. For example, as shown in, e.g., FIG. 2, tubing slot 114 can vary in size and/or shape and can be adapted for facilitating insertion of tubing 112 into tubing slot 114, facilitating placement of tubing 112 into tubing slot 114, and at least partially resisting dislodgment of tubing 112 from within tubing slot 114, such as for helping retain tubing 112 in a correct position within tubing slot 114 for proper valve functionality. In at least one embodiment, tubing slot 114 can include a first portion 114a having an inside dimension d1 and a second portion 114b having an inside dimension d2 different from the inside dimension d1 of the first portion. For instance, first portion 114a can be configured for allowing insertion of tubing 112 into slot 114 and at least partially resisting removal or escape of the tubing from the slot, such as by having an inside dimension d1 smaller than an outside dimension d3 of tubing 112 yet large enough for receiving the tubing in a compressed or reduced-diameter state. The difference between inside dimension d1 of the first portion 114a and outside dimension d3 of tubing 112 can be any difference according to a physical embodiment of the disclosure, and in at least one embodiment, can generally call for pinching and/or longitudinally stretching a portion of tubing 112 upon insertion of the tubing into tubing slot 114 in order to temporarily reduce the outside dimension of the tubing so as to slide or otherwise pass through first portion 114a of tubing slot 114 toward second portion 114b of tubing slot 114. Second portion 114b can be configured for receiving at least a portion of tubing 112 therein or therethrough (see, e.g., FIGS. 1-4) and for holding or helping hold tubing 112 in one or more positions during valve operations, whether separately or in combination with first portion 114a of tubing slot 114. For example, in at least one embodiment, second portion 114b can have an inside dimension d2 equal to or about equal to an outside dimension d3 of a corresponding tubing 112 or portion thereof. Alternatively, or collectively, second portion 114b of tubing slot 114 can have an inside dimension d2 larger or smaller than outside dimension d3 of tubing 112. Inside dimension d2 of second portion 114b of tubing slot 114 can, but need not, be uniform. For example, in at least one embodiment, second portion 114b can be circular, in whole or in part. As another example, second portion 114b can be oblong, oval, C-shaped, or of another shape adapted for receiving at least a portion of tubing 112. In at least one embodiment, inside dimension d2 of second portion 114b and/or a shape of second portion 114b can vary such that one or more portions of second portion 114b of tubing slot 114 contact and/or partially compress tubing 112 (when present) while other portions may not. Said another way, second portion 114b of tubing slot 114 can be configured for multipoint contact with an outside surface 132 of tubing 112 or for uniform contact with outside surface 132 of tubing 112 (or at least a portion thereof) when tubing 112 is inserted into second portion 114b of tubing slot 114. In this manner, second portion 114b of tubing slot 114 can at least partially resist dislodgment of tubing 112 from the slot 114 during valve operations, separately or in combination with such resistance as may be provided by a relatively smaller first portion 114a of tubing slot 114, if present.

As will be understood by a person of ordinary skill in the art having the benefits of the present disclosure, the sizing of slot 113 can depend on the size of a physical embodiment of the present disclosure at hand and the corresponding tubing size for which such physical embodiment is made or intended. Common sizes and types of tubing suitable for use with pinch valves are known in the art and include numerous different flow areas and compressible materials. Physical embodiments of the present disclosure can be adapted to cooperate with any size(s) or type(s) of such tubing, whether now known or future developed.

In at least one embodiment, valve 100 can include a tubing retainer 134 for retaining or otherwise holding or supporting tubing 112 within tubing slot 114 during valve operations. Tubing retainer 134 can be adapted to cover at least a portion of tubing slot 114 or one or more portions thereof and can be adapted to couple with headpiece 110, removably or otherwise. Tubing retainer 134 can also (separately or collectively) be adapted for safety reasons, such as for at least partially preventing a user from accessing tubing slot 114 during valve operations so as to prevent a user's fingers from being pinched or the like. Tubing retainer 134 can be or include a single retainer or multiple retainers. In at least one embodiment, valve 100 can include a coupler 136, such as a groove or slot, for example on an exterior surface 138 of headpiece 110 (and/or housing 102), and tubing retainer 134 can be configured to couple with coupler 136, which can include comprising one or more couplers 140 configured to couple with coupler 136 or another coupler coupled to headpiece 110 and/or housing 102. For instance, coupler 140 can be or include one or more extensions or arms configured to couple with coupler 136, such as by snap fit, spring fit, interference fit, or another configuration adapted for removably coupling tubing retainer 134 to headpiece 110 about tubing slot 114. In at least one embodiment, tubing retainer 134 can be otherwise coupled to valve 100, such as by way of mechanical or other fasteners.

In at least one embodiment, valve 100 can include one or more pinching members 142 for pinching tubing 112, such as one or more cylindrical or otherwise shaped pins coupled to at least one of plunger 128 and headpiece 110. As shown in FIG. 4, for example, valve 100 can include a first pin 142a coupled to plunger 128 and a second pin 142b coupled to headpiece 110 and disposed at least partially within or otherwise relative to tubing slot 114 for cooperating with first pin 142a and/or plunger 128 for pinching tubing 112. Second pin 142b can, but need not, be fixed relative to headpiece 110 in the longitudinal direction of valve 100. During a pinching operation, plunger 128 can move first pin 142a in a longitudinal direction toward second pin 142b for pinching a portion of tubing 112 disposed in tubing slot 114. Valve 100 can be configured for stopping movement of first pin 142a in a position or location relative to second pin 142b for adequately pinching tubing 112 so as to at least partially restrict fluid flow there through. As will be understood by a person of ordinary skill in the art having the benefits of the present disclosure, a distance (if any) between first pin 142a and second pin 142b and/or first and second pinching surfaces 130a, 130b in a fully closed valve position can and likely will depend on the size and/or type of tubing 112 for which a physical embodiment of the present disclosure is sized. For example, such distance in a fully closed position can depend on the wall thickness t of tubing, which can be any thickness according to a particular physical embodiment and can be configured to be a small enough distance to accomplish a desired flow restriction (which can but need not be a total restriction) yet a large enough distance for at least partially minimizing damage to or wear of the tubing as a result of, for example, repeated pinching operations. First and second pins 142a, 142b can, but need not, be rotationally fixed. In at least one embodiment, one or more of pins 142a, 142b can be rotatably coupled to plunger 128 and/or headpiece 110.

With continuing reference to the Figures, and particular reference to FIGS. 7-9, another of many embodiments of a valve according to the disclosure will now be described. As shown, for example, in FIG. 7, a valve 200 according to the disclosure can generally include one or more of the features discussed herein with regard to valve 100 and can further include an override 202 for optionally controlling the position of plunger 128. For example, override 202 can be configured for overriding a position of plunger 128 accomplished by the valve actuating components, such as in the event of a failure or power loss during valve operations. As shown, for example, in FIG. 8, override 202 can be or include a manual override mechanism. However, this need not be the case, and alternatively or collectively, override 202 can be or include an automatic or automated override mechanism, such as a mechanical mechanism coupled with an electrically, hydraulically, or air powered motion source. As depicted in the embodiment of FIGS. 7-9 for illustrative purposes, which embodiment is but one of many, a manual override 202 can be coupled to headpiece 110, such as on the end or on a side of tubing slot 114 longitudinally opposite housing 102, and can be configured to optionally move one or more pinching surfaces, for example in the longitudinal direction. Override 202 can include an actuator 204 and an override arm 206 and actuator 204 can be configured to optionally move override arm 206 into contact with plunger 128 and/or first pinching surface 130a, which can include contacting first pin 142a if present. In at least one embodiment, actuator 204 can alternatively (or collectively) be configured to move second pinching surface 130b. Actuator 204 can be or include an actuator cap 208 movably coupled to headpiece 110, such as to an exterior surface 138 of headpiece 110. For example, actuator cap 208 can be threadably coupled to headpiece 110 and configured to move override arm 206 in one or more directions upon actuator cap 208 being rotated relative to headpiece 110, such as in a clockwise or counterclockwise direction. As other examples, actuator cap 208 can be adapted to slide relative to headpiece 110 or otherwise move in a manner for moving override arm 206 in one or more directions, such as longitudinally toward or away from plunger 128. Override 202 can be configured to optionally force plunger 128 in one or more directions, such as in the longitudinal direction toward the housing 102, for instance when a malfunction or other problem has resulted in a valve becoming stuck in an undesired position for purposes of a fluid control system in which valve 100 is included, which can be any of many control systems across the various industries in which the valves of the present disclosure can be utilized.

With continuing reference to the Figures, and particular reference to FIG. 10, one of many embodiments of a valve system according to the disclosure will now be described. As shown, for example, in FIG. 10, a valve system 300 according to the disclosure can include a control system 350 for controlling and/or supporting control of a valve and, in at least one embodiment, one or more other components for controlling fluid flow (further described below). Control system 350 can couple with a valve for sensing one or more variables or attributes of valve operations, such as any of the valves of the present disclosure, or other valves. Control system 350 is described herein with reference to valve 100 (and/or valves 200, et seq.) of the present disclosure and their various components for purposes of illustration and ease of explanation, but can be adapted for controlling other types of pinch valves. Control system 350 can, but need not, be at least partially disposed within housing 102, and in at least one embodiment can be housed fully within housing 102, which can, but need not, include one or more openings or connectors in or through housing 102 for supporting communication with one or more other components of valve system 300 or another fluid control system, such as power supplies, computers, routers, wiring, transmitters, receivers and other components for controlling fluid flow.

In at least one embodiment, control system 350 can include one or more position sensors 352 for sensing one or more positions or states of valve 100 or a component thereof, such as by sensing a position of plunger 128 or another component of the valve at a time or times for determining whether valve 100 is in a fully opened position, fully closed position, or another position at the time(s) of sensing. Position sensor 352 can be or include any type of position sensor according to a physical embodiment of the disclosure, such as, for example, proximity switches, micro snap switches, light sensors, LED beam sensors, and/or other types of position sensors. In at least one embodiment, one or more position sensors 352 can be coupled to and/or housed within housing 102 and/or headpiece 110. For example, one or more position sensors 352 can be configured for sensing the position of any of piston rod 116, piston plate 122, plunger 128, pinching surfaces 130a, 130b, pins 142a, 142b, spring guide 120, shoulder 124, tubing retainer 134, override arm 206 and actuator cap 208, whether separately or in combination with one another or any other component of the valve. In at least one embodiment, such sensing can include sensing one or more targets (not shown) coupled to one or more components of valve 100, such as, for example, a ferrous metal or other target for communicating with one or more position sensors 352 (e.g., magnetically).

Control system 350 can include one or more tube sensors (or tubing sensors) 354, for sensing whether a fluid conduit, such as a tube or tubing, is present in tubing slot 114 and/or whether tubing 112 is correctly or incorrectly positioned within tubing slot 114. Control system 350 can include one or more flow sensors 356 for sensing one or more fluid flow variables, which can include, for instance, whether fluid is present and/or flowing, pressure and/or flow rate. Flow sensor 356 can be configured to clamp onto or around tubing 112 or can be integral to or otherwise coupled in sensing communication with tubing 112 or a fluid flow path of valve 100. Flow sensor 356 can be or include any type of flow sensor according to a physical embodiment of the disclosure, such as, for example, piezoelectric ultrasonic sensors, ultrasonic transducers, and/or other types of sensors for sensing fluid flow. In at least one embodiment, valve 300 can include one, two, three, four, or more flow sensors 356, which can be coupled to and/or housed at least partially within housing 102 or another portion of valve 100. One or more flow sensors 356 can be configured for measuring fluid flow fluidically upstream of and/or downstream from one or more tube sensors 354. In at least one embodiment, operation of one or more flow sensors 356 can, but need not, be dependent upon a signal from one or more position sensors 352. For example, control system 350 can be configured for preventing operation of a flow sensor 356 at one or more times, such as when valve 100 is in a closed position or when no tubing 112 is present in tubing slot 114.

Any of the aforementioned sensors can be configured for indicating (i.e., in addition to sensing) one or more parameters or sensing results, such as by sending or otherwise communicating one or more signals to one or more other components of control system 350 or valve system 300. For example, any of sensors 352, 354, 356 can be adapted for communication with one or more controllers, such as process controller 358. Process controller 358, which can include a plurality of controllers, can be at least partially disposed within housing 102, in whole or in part, whether separately or in combination with one or more of the sensors described above. For example, process controller 358 can include one or more controllers disposed at least partially within housing 102 or otherwise coupled to valve 100 and one or more controllers disposed elsewhere. In at least one embodiment, control system 350 can communicate and cooperate with one or more other components of valve system 300 or another fluid control system for supporting operation of one or more valves, whether separately or in combination with other components of such a flow control system (if present). For example, control system 350 can be configured for controlling one or more pumps 360 (e.g., peristaltic, pulse flow, diaphragm, or other pumps) or other valves, whether independently or collectively with one or more other controllers or control systems. In at least one embodiment, control system 350 can be configured to determine and communicate the status of one or more variables, for instance by communicating one or more signals, such as through a wired connection, wireless connection, and/or other connection, separately or in combination. Such variables include, but are not limited to, whether a valve is in an on or off position, safe mode, shut off mode, alarm mode, lock mode (e.g., when tubing 112 is not in place), flow check or crosscheck, indication measurements for process flow, and/or one or more other variables, such as cycle count, dosing or metering information, batch controller information, or other data, separately or in combination.

Valve system 300 and/or control system 350 can be adapted for implementing control logic for allowing or preventing one or more fluid control functions based on input from one or more of the sensors described above, such as for safety, operational or other reasons. Such logic can include measures for controlling the order in which one or more functions occur or can occur, which can be any order according to a physical implementation of the disclosure. For example, valve system 300 and/or control system 350 can implement any one or more of the following steps, separately or in combination with one another, and in any order: determining whether tubing is properly, improperly or otherwise coupled to (including absent from) a valve; sending feedback or signals to one or more controllers; receiving feedback or signals from one or more controllers; signaling one or more indicators or displays (see, e.g., FIG. 11); prompting one or more inputs or outputs; determining whether a valve can open or close; opening or closing a valve; indicating whether a valve is open, closed or in another position; allowing or preventing fluid flow; allowing or preventing operation of one or more pumps; signaling an alarm; prompting or allowing an optional override; outputting signals to one or more devices, such as counters, alarms, dosing meters, batch controllers or communication hardware; conveying or otherwise displaying information, such as audibly, visibly, mechanically or otherwise; communicating with one or more internal or external devices; reacting to signals from one or more internal or external devices, which can include opening or closing a valve. As used herein, the term valve includes any portion or component of a valve.

With continuing reference to the Figures, and particular reference to FIGS. 11-15, another of other of many embodiments of a valve according to the disclosure will now be described. As shown, for example, in FIG. 11, a valve 400 according to the disclosure can generally include one or more of the features discussed herein with regard to valves 100, 200 and systems 300, 350 and can further include a control module 450 for controlling and/or supporting control of a valve, such as by housing or otherwise supporting one or more components of control system 350. Control module 450 can include a control module housing 452 for holding or otherwise supporting one or more control components coupled to housing 102 and/or headpiece 110 and can at least partially support one or more sensors, such as sensors, 352, 354, 356, controllers, such as controller 358 (which can include one or more controllers housed within module 450 or housing 452) and other control components coupled thereto or disposed therein, as further described below.

In at least one embodiment, control module 450 can be coupled to a side or other portion of housing 102 and/or headpiece 110 and arranged for supporting and communicating with one or more sensors coupled to valve 400 and/or for communicating with users or other system components. Control module 450 can include one or more components for inputting or outputting information, such as from or to another component of valve 400 (e.g., control system 350, if present), another component of a fluid control system in which valve 400 is included, or a user or operator of the valve, separately or in combination. For example, control module 450 can include one or more buttons 454 for inputting information or controlling one or more aspects of the module's functionality, such as display options, units, powering on and off, and the like. Control module 450 can include one or more indicators 456, such as indicator lights, for indicating or otherwise communicating one or more states or statuses of valve 400, such as valve position (e.g., open or closed), operational status (e.g., normal or abnormal, ready or not ready), tubing presence, operational life, fluid flow status, or the like. Indicators 456 can be or include any type of light according to a physical embodiment of the disclosure, such as light emitting diodes (LEDs) or other light sources, and in at least one embodiment can be or include one or more other types of indicators, such as audible or mechanical indicators. Control module 450 can include one or more displays 458 for displaying information to a user, such as information pertaining to any of the parameters mentioned above or other valve information (e.g., flow rate, cycle count, time in service, remaining time in service, error details, etc.). Display 458 can be or include any type of display(s) according to a physical embodiment of the disclosure, such as, for example, digital displays, analog displays, liquid crystal displays (LCDs), LED displays or other user readable interfaces. Buttons 454, indicators 456 and display 458 can be coupled to control module housing 452 in any manner, including in any of a plurality of manners for at least partially resisting ingress of moisture and debris into housing 452 and/or positioning one or more of such components for optimal visibility and usability in accordance with a physical implementation. While control module 450 is shown coupled to a side of valve 400 in the exemplary embodiment of, e.g., FIG. 11, this need not be the case and, alternatively (or collectively), control module 450 can be coupled to the top, bottom and/or another portion of valve 100. As another example, control module 450 can be at least partially integral with housing 102, which can include being partially or wholly disposed within housing 102.

In at least one embodiment, control module 450 can be configured to sense and/or receive sensing signals pertaining to one or more aspects of valve operations and to convey corresponding information to a user or other system component. For example, control module 450 can include one or more position sensors 352 coupled to housing 102 (see, e.g., FIG. 13) and configured to sense a position(s) of one or more valve components in the manner described elsewhere herein. One or more position sensors 352 can be coupled to housing 102 in any manner, such as via one or more openings 460, and can communicate with one or more controllers housed within control module housing 452, such as by way of wires 462 routed through an access 464 in housing 452 or in another manner (which can include wireless communication). Control module 450 can include one or more flow sensors 356 coupled to housing 102 (see, e.g., FIG. 13) and configured to sense one or more flow conditions, such as whether fluid is flowing or flow rate. In at least one embodiment, one or more flow sensors 356 can be coupled to housing 452 or a portion thereof, such as one or more extensions 466 for supporting the sensors and holding the sensors in flow sensing communication with valve 400 and tubing 112 (when present). Control module 450 can include one or more tube sensors 354 coupled to housing 102 (see, e.g., FIG. 15) and configured to sense whether tubing 112 is present and/or correctly positioned in tubing slot 114. For example, one or more tube sensors 354 can be coupled to a valve component, such as one or more pinching members 142, pinching surfaces 130*a*, 130*b* or another portion of valve 400, in sensing communication with tubing slot 114 and configured to communicate the presence or absence of tubing 114 to a controller housed within or coupled to control module housing 452.

In at least one embodiment, control module 450 can be configured to convey information via at least one of display 458 and/or one or more indicators 456, separately or in combination. For instance, control module 450 can be configured for providing various types of information by way of turning on and/or off one or more indicators 456 of the same or different colors, which can include cycling one or more indicators 456 in one or more sequences or patterns for conveying information to a user. Such information can include, but is not limited to, whether there is power to the valve, whether the valve is functioning normally, whether the valve needs service or replacement, whether the valve is within an acceptable range of temperatures, valve position, and other data relevant to control or operation of a valve or fluid control system in which control module 450 is included, separately or in combination. In at least one embodiment, control module 450 can include one or more data ports 468 for electronic communication with one or more controllers coupled to or housed within module housing 452. For example, data port 468 can be configured for supporting testing or diagnostics of module 450, such as by way of communicating relevant information to one or more computers (not shown). As another example, data port 468 and control module 450 can be configured for communicating information among a plurality of valves 400 utilized within a flow control system, which can include communication among two or more valves 400 or among one or more valves 400 and an external computer or control center for monitoring or controlling system operations, separately or in combination.

As shown in FIGS. 11-14 for illustrative purposes, control module 450 can, in at least one embodiment, include a control module housing 452 coupled to a side of valve 400 (e.g., housing 102 and/or head piece 110) opposite tubing slot 114 or an opening thereof. Further, control module housing 452 can be coupled to valve 400 using one or more couplers 470, such as screws, bolts or other fasteners. However, this need not be the case and control module 450 can alternatively, or collectively, be configured and coupled to valve 400 in any of a plurality of different ways. For example, as illustrated in FIGS. 16-17, control module 450 can include a housing 552 for coupling to a side of a valve 500 opposite ports 104*a*, 104*b* and which can, but need not, include a downward-facing tubing slot 514. As yet another example, control module 450 can include a control module housing 652 for coupling to a side of a valve 100, 200, 400 including tube slot 114 (see FIGS. 18-19). In such an embodiment, which is but one of many, control module housing 652 can be configured for covering at least a portion of tubing slot 114, whether optionally or otherwise, which can include serving an additional or supplemental purpose of a tubing retainer (such as the retainer 134 described above) and/or finger guard or safety guard. Further, control module housing 652 can be removably coupled to housing 102 and/or headpiece 110 (e.g., in a snap-on configuration as illustrated in FIGS. 18-19) or otherwise coupled thereto or therewith, such as mechanically or integrally.

A control module for a pinch valve can include a controller housing, one or more controllers coupled to the controller housing, one or more displays coupled to the controller housing, one or more indicators coupled to the controller housing, and one or more sensors coupled to the controller, such as flow sensors, proximity sensors and/or tube sensors. A control module or controller housing can be adapted to couple to a pinch valve or one or more portions thereof. One or more flow sensors can include first and second flow sensors coupled to a housing and a controller housing can be adapted to dispose the first and second flow sensors on opposite sides of a tube slot, such as when the controller housing is coupled to a pinch valve. One or more flow sensors can be coupled to supports, such as extensions or arms, which can be disposed on a side of a controller housing, such as opposite or otherwise relative to a display or other module component.

A control module can include first and second proximity sensors configured to sense one or more targets or other components for determining whether a pinch valve is in one or more positions, such as one or more open or closed positions, fully, partially or otherwise. A controller housing can be configured to couple to at least one of a pinch valve housing, a pinch valve headpiece and a combination thereof. A controller housing can be configured to couple to a pinch valve on a side opposite a tube slot opening, on a side including a tube slot, or on another portion of a valve or valve component. A controller housing can include a guard configured to cover at least a portion of a tube slot when the controller housing is coupled to a pinch valve. A controller housing can be configured to couple to a pinch valve by at least one of mechanical fasteners, adhesive, snap-fit and a combination thereof, and can include one or more components for communicating in a wired or wireless configuration, such as transmitters or receivers. A control module can include one or more data ports, such as a data port coupled to the controller housing, which can be configured for electronic communication between one or more controllers disposed within the module and one or more second controllers disposed elsewhere, such as distally from the module or outside of the controller housing.

A control module can be configured to communicate with a process controller. One or more controllers can be configured to output at least one of a valve operation cycle count, an alarm signal, a dosing signal, a metering signal, a batch control signal, and a combination thereof. An indicator can include one or more indicator lights and can configured to display one or more of a plurality of indications, such as based on one or more signals from one or more sensors, such as at least one of one or more flow sensors, one or more proximity sensors, one or more tube sensors and a combination thereof. Operation of one or more sensors can be dependent upon one or more signals from one or more other sensors. Operation of the one or more flow sensors can be dependent upon one or more signals from at least one of one or more proximity sensors, one or more tube sensors and a combination thereof.

A pinch valve can include a valve housing, a headpiece coupled to the valve housing, wherein the headpiece can include a tube slot adapted to receive a portion of tubing through a tube slot opening, and a control module. The control module can include a controller housing coupled to at least one of the valve housing, the headpiece and a combination thereof, a controller disposed at least partially within the controller housing, a display coupled to the controller housing, one or more indicator lights coupled to the controller housing, one or more flow sensors electronically coupled to the controller, one or more proximity sensors electronically coupled to the controller, and one or more tube sensors electronically coupled to the circuit board. A pinch valve can include one or more flow sensors, such as first and second flow sensors, coupled to the controller housing and disposed on opposite sides of the tube slot. One or more flow sensors can be disposed upstream and/or downstream from a tube slot. One or more flow sensors can be coupled to a controller housing or a portion thereof and can be disposed in one or more locations relative to other valve or module components. A pinch valve can include one or more proximity sensors, such as first and second proximity sensors, which can be coupled to the valve housing and configured to sense at least one target for determining whether the pinch valve is in one or more positions. A controller housing can be disposed for blocking a tube slot opening or avoiding interference with a tube slot opening. A control module can be configured to send a signal to a pump controller based on a signal from at least one of one or more sensors.

A pinch valve system can include a plurality of pinch valves, each pinch valve having a valve housing and a headpiece coupled to the valve housing, wherein the headpiece can include a tube slot adapted to receive a portion of tubing through a tube slot opening, and a control system comprising a system controller and a plurality of control modules. One or more of the plurality of control modules can be coupled to a corresponding one of the plurality of pinch valves. One or more of the plurality of control modules can include a controller housing, a module controller disposed at least partially within the controller housing, a display coupled to the controller housing, one or more indicator lights coupled to the controller housing, one or more flow sensors electronically coupled to the module controller, one or more proximity sensors electronically coupled to the module controller and one or more tube sensors electronically coupled to the module controller. One or more of the plurality of control modules can be coupled in electronic communication with the system controller.

A pinch valve can include a housing having a first fluid port and a second fluid port, a headpiece coupled to the housing, wherein the headpiece can include a slot adapted to receive a portion of tubing, a piston rod having a first piston rod end and a longitudinally opposite second piston rod end, wherein first piston rod end is disposed within the housing, a spring guide coupled to the first piston rod end, a spring coupled to the spring guide, a piston plate coupled to the first piston rod end, wherein the piston plate is sealingly or sealably coupled to an interior surface of the housing and configured to slide along the interior surface between the first and second fluid ports, a plunger coupled to the second piston rod end, wherein the plunger can include a first pinching surface, and a second pinching surface coupled to the headpiece and disposed at least partially within the slot, wherein the first pinching surface is configured to move relative to the second pinching surface between fully open and fully closed valve positions.

A pinch valve can include a control system coupled to the valve, wherein the control system can include a position sensor configured to sense one or more positions of the valve, a tubing sensor configured to sense whether tubing is present in the slot, and a flow sensor configured to measure fluid flow through the valve. A control system can include a controller in electronic communication with one or more of the sensors and configured to output at least one of a valve operation cycle count, an alarm signal, a dosing signal, a metering signal, a batch control signal, and a combination thereof. A flow sensor can be configured to measure fluid flow fluidically upstream or downstream from a tubing sensor. A position indicator can be configured to indicate whether a valve is in one or more positions. A tubing sensor can be configured to sense whether tubing is in one or more positions relative to the tubing sensor. Operation of a flow sensor can be dependent upon a signal from one or more other sensors, which can include a position sensor.

A pinch valve can include a tube slot of varying shape and/or size. A tube slot can include a first portion having a dimension, such as an inside, outside or another dimension, which can be or include a diameter, and a second portion having a dimension the same as or different from, which can include being less than or greater than, the dimension of the first portion. A piston plate can be coupled between a spring guide and a shoulder of a piston rod. A tubing retainer can be coupled to a headpiece, such as to an exterior of the headpiece. An exterior of the headpiece can include a coupler, such as a groove, and a tubing retainer can include a coupler, such as an extension, configured to couple with the groove.

A pinch valve can include one or more pinching members and at least one of one or more pinching surfaces can be or include an exterior surface of a pin, which can be or include a cylindrical or tubular pin. A pinch valve can include one or more cylindrical pins coupled to at least one of the plunger and the headpiece. A pinch valve can include an override coupled to the headpiece, such as on a side of a tube slot longitudinally or otherwise opposite the housing. An override can be configured to optionally move one or more pinching surfaces or members away from one or more other pinching surfaces or members. An override can include an actuator and an override arm, and the actuator can be configured to optionally move the override arm into contact with the plunger or another valve component. An override arm can be configured to force a plunger toward the housing. An override can include a cap rotateably or otherwise moveably coupled to a headpiece. A pinch valve system can include one or more pinch valves, one or more controllers, one or more pumps and one or more computers, such as computers disposed in a control center. A method of controlling a pinch valve can include sensing one or more aspects of one or more valves, inputting or outputting sensed information, and controlling one or more valves based on all or part of such information.

Other and further embodiments utilizing one or more aspects of the systems and methods described above can be devised without departing from the spirit of Applicants' disclosures. For example, the systems and methods disclosed herein can be used alone or to form one or more parts of other valves, valve components and/or fluid control systems. Further, the various methods and embodiments of the valves and control components can be included in combination with each other to produce variations of the disclosed methods and embodiments. Discussion of singular elements can include plural elements and vice-versa. References to at least one item followed by a reference to the item can include one or more items. Also, various aspects of the embodiments can be used in conjunction with each other to accomplish the understood goals of the disclosure.

Unless the context requires otherwise, the words "comprise," "include," and "has" (including variations and conjugations thereof, such as "comprises," "including," "have" and so forth) should be understood to imply the inclusion of at least the stated element or step or group of elements or steps or equivalents thereof, and not the exclusion of a greater numerical quantity or any other element or step or group of elements or steps or equivalents thereof. The devices, apparatuses and systems can be used in a number of directions and/orientations. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components and/or can be combined into components having multiple functions.

The embodiments have been described in the context of preferred and other embodiments and not every embodiment of Applicants' disclosure has been described. Obvious modifications and alterations to the described embodiments are available to those of ordinary skill in the art having the benefits of the present disclosure. The disclosed and undisclosed embodiments are not intended to limit or restrict the scope or applicability of Applicants' disclosures, but rather, in conformity with the patent laws, Applicants intend to fully protect all such modifications and improvements that come within the scope or range of equivalents of the claims.

What is claimed is:

1. A control module for a pinch valve, comprising:
a controller housing;
a controller disposed at least partially within the controller housing;
a display coupled to the controller housing;
one or more indicator lights coupled to the controller housing;
one or more flow sensors electronically coupled to the controller; and
one or more proximity sensors electronically coupled to the controller, wherein operation of the one or more flow sensors is prevented upon a first signal from at least one of the one or more proximity sensors;
wherein the controller housing is configured to couple to a pinch valve.

2. The control module of claim 1, further comprising a tube sensor electronically coupled to the controller, wherein the tube sensor is configured to sense whether a tube is present in a tube slot of the pinch valve, and wherein operation of the one or more flow sensors is prevented when no tube is present in the tube slot.

3. The control module of claim 1, wherein the one or more flow sensors comprise first and second flow sensors coupled to the controller housing and wherein the controller housing is configured to dispose the first and second flow sensors on opposite ends of a tube slot when the controller housing is coupled to a pinch valve.

4. The control module of claim 3, wherein the first and second flow sensors are coupled to first and second extensions, respectively, wherein the first extension disposes the first flow sensor on an upstream end of the tube slot and the second extension disposes the second flow sensor on a downstream end of the tube slot.

5. The control module of claim 1, wherein the one or more proximity sensors comprise first and second proximity sensors configured to sense at least one target for determining whether a pinch valve is in one or more positions.

6. The control module of claim 1, wherein the controller housing is configured to mount onto a pinch valve headpiece.

7. The control module of claim 6, wherein the controller housing is configured to mount onto the pinch valve headpiece on a side opposite a tube slot opening.

8. The control module of claim 6, wherein the controller housing comprises a guard configured to cover at least a portion of a tube slot when the controller housing is mounted onto the pinch valve headpiece.

9. The control module of claim 6, wherein the controller housing is configured to mount onto the pinch valve headpiece by mechanical fasteners.

10. The control module of claim 1, further comprising a transmitter disposed at least partially within the controller housing.

11. The control module of claim 1, further comprising a data port coupled to the controller housing, wherein the data port is configured for electronic communication between the controller and a second controller disposed outside of the controller housing.

12. The control module of claim 11, further comprising a transmitter configured to transmit information between the controllers.

13. The control module of claim 1, wherein the controller is configured to output at least one of a valve operation cycle count, an alarm signal, a dosing signal, a metering signal, a batch control signal, and a combination thereof.

14. The control module of claim 2, wherein the one or more indicator lights are configured to display one or more of a plurality of indications based on a signal from at least one of the one or more flow sensors, the one or more proximity sensors, the tube sensor and a combination thereof.

15. The control module of claim 2, wherein operation of the one or more flow sensors is further dependent upon a second signal from the tube sensor.

16. A pinch valve, comprising:
a valve housing;
a headpiece coupled to the valve housing, wherein the headpiece comprises a tube slot adapted to receive a portion of tubing through a tube slot opening; and
a control module comprising
a controller housing coupled to at least one of the valve housing, the headpiece and a combination thereof;
a controller disposed at least partially within the controller housing;
a display coupled to the controller housing;
one or more indicator lights coupled to the controller housing;
one or more flow sensors electronically coupled to the controller, wherein the one or more flow sensors comprise first and second flow sensors coupled to the controller housing and disposed on opposite ends of the tube slot;
one or more proximity sensors electronically coupled to the controller; and
a tube sensor electronically coupled to the controller, wherein the tube sensor is configured to sense whether the portion of tubing is present in the tube slot, wherein the first flow sensor is configured to measure fluid flow upstream of the tube sensor and the second flow sensor is configured to measure fluid flow downstream of the tube sensor.

17. The pinch valve of claim 16, wherein the first and second flow sensors are coupled to extensions disposed on a side of the controller housing opposite the display.

18. The pinch valve of claim 16, wherein the one or more proximity sensors comprise first and second proximity sensors coupled to the valve housing and configured to sense at least one target for determining whether the pinch valve is in one or more positions.

19. The pinch valve of claim 16, wherein the controller housing is disposed on a side of the pinch valve opposite the tube slot opening.

20. The pinch valve of claim 16, wherein the control module is configured to send a signal to a pump controller based on a signal from the tube sensor.

21. A pinch valve, comprising:
a valve housing;
a headpiece coupled to the valve housing, wherein the headpiece comprises a tube slot adapted to receive a portion of tubing through a tube slot opening; and
a control module comprising a controller housing coupled to at least one of the valve housing, the headpiece and a combination thereof;
a controller disposed at least partially within the controller housing;
a display coupled to the controller housing;
one or more indicator lights coupled to the controller housing;
first and second flow sensors electronically coupled to the controller housing and disposed on opposite ends of the tube slot;
one or more proximity sensors electronically coupled to the controller, wherein operation of the first and second flow sensors is dependent upon a first signal from at least one of the one or more proximity sensors; and
a tube sensor electronically coupled to the controller, wherein the tube sensor is configured to sense whether the portion of tubing is present in the tube slot, wherein the first flow sensor is configured to measure fluid flow upstream of the tube sensor and the second flow sensor is configured to measure fluid flow downstream of the tube sensor, and wherein operation of the first and second flow sensors is prevented based upon a second signal from the tube sensor.

* * * * *